United States Patent
Chua et al.

(10) Patent No.: US 10,629,933 B2
(45) Date of Patent: Apr. 21, 2020

(54) PROCESS FOR PRODUCING HYDROGEN FROM HYDROCARBONS

(71) Applicant: HAZER GROUP LTD, Perth, Western Austrlia (AU)

(72) Inventors: Hui Tong Chua, Mount Claremont (AU); Andrew Cornejo, Winthrop (AU); Colin Llewellyn Raston, Cooloongup (AU); Lizhen Gao, Nedlands (AU)

(73) Assignee: HAZER GROUP LTD, Perth, Western Australia (AU)

( * ) Notice: Subject to any disclaimer, the term of this patent is extended or adjusted under 35 U.S.C. 154(b) by 669 days.

(21) Appl. No.: 14/954,654

(22) Filed: Nov. 30, 2015

(65) Prior Publication Data

US 2016/0156051 A1    Jun. 2, 2016

Related U.S. Application Data

(63) Continuation of application No. 13/395,816, filed as application No. PCT/AU2010/001168 on Sep. 9, 2010.

(30) Foreign Application Priority Data

Sep. 10, 2009   (AU) ................................ 2009904346
Feb. 15, 2010   (AU) ................................ 2010900607

(51) Int. Cl.
*H01M 8/0612*   (2016.01)
*H01M 8/1018*   (2016.01)
(Continued)

(52) U.S. Cl.
CPC .......... *H01M 8/0618* (2013.01); *B01J 23/83* (2013.01); *B01J 23/883* (2013.01);
(Continued)

(58) Field of Classification Search
CPC ........ B01J 23/745; B01J 23/83; B01J 23/883; B01J 37/0225; B82Y 30/00; B82Y 40/00;
(Continued)

(56) References Cited

U.S. PATENT DOCUMENTS 3,284,161 A  *  11/1966  Pohlenz .................... C01B 3/30
                                                    423/651
6,162,267 A      12/2000  Priegnitz et al.
(Continued)

OTHER PUBLICATIONS

International Search Report and Written Opinion of the International Searching Authority, Australian Patent Office, issued in connection with International Application No. PCT/AU2010/001168, dated Dec. 16, 2010.

*Primary Examiner* — Adam A Arciero
(74) *Attorney, Agent, or Firm* — Marshall, Gerstein & Borun LLP

(57) ABSTRACT

A process for producing hydrogen from a hydrocarbon gas comprising contacting at elevated temperature the hydrocarbon gas with a catalyst to catalytically convert the hydrocarbon gas to hydrogen and solid carbon; wherein, the catalyst comprises one or both of the following: (a) a calcined Fe-containing catalyst; or (b) a bimetallic $M_xNi_y$-type catalyst supported on a substrate.

19 Claims, 16 Drawing Sheets

(51) Int. Cl.

| | |
|---|---|
| *H01M 8/1007* | (2016.01) |
| *C01B 3/40* | (2006.01) |
| *H01M 8/0662* | (2016.01) |
| *B01J 37/02* | (2006.01) |
| *B01J 23/883* | (2006.01) |
| *C01B 3/26* | (2006.01) |
| *B82Y 30/00* | (2011.01) |
| *B01J 23/83* | (2006.01) |
| *B82Y 40/00* | (2011.01) |
| *C01B 32/05* | (2017.01) |
| *C01B 32/20* | (2017.01) |
| *C01B 32/16* | (2017.01) |
| *B01J 23/745* | (2006.01) |

(52) U.S. Cl.
CPC ........... *B01J 37/0225* (2013.01); *B82Y 30/00* (2013.01); *B82Y 40/00* (2013.01); *C01B 3/26* (2013.01); *C01B 3/40* (2013.01); *C01B 32/05* (2017.08); *C01B 32/16* (2017.08); *C01B 32/20* (2017.08); *H01M 8/0687* (2013.01); *H01M 8/1007* (2016.02); *H01M 8/1018* (2013.01); *B01J 23/745* (2013.01); *C01B 2203/0227* (2013.01); *C01B 2203/0277* (2013.01); *C01B 2203/043* (2013.01); *C01B 2203/066* (2013.01); *C01B 2203/067* (2013.01); *C01B 2203/068* (2013.01); *C01B 2203/1041* (2013.01); *C01B 2203/1052* (2013.01); *C01B 2203/1058* (2013.01); *C01B 2203/1241* (2013.01); *C01B 2203/84* (2013.01); *H01M 2250/20* (2013.01); *H01M 2300/0082* (2013.01); *Y02T 90/32* (2013.01)

(58) Field of Classification Search
CPC ...... C01B 2203/0277; C01B 2203/043; C01B 2203/066; C01B 2203/1041; C01B 2203/1241; C01B 31/02; C01B 31/0226; C01B 31/04; C01B 3/26
See application file for complete search history.

(56) References Cited

U.S. PATENT DOCUMENTS

| | | | |
|---|---|---|---|
| 6,869,585 B2 * | 3/2005 | Otsuka | B01J 8/0085 422/626 |
| 6,875,417 B1 | 4/2005 | Shah et al. | |
| 6,916,562 B1 | 7/2005 | Gosselink et al. | |
| 7,001,586 B2 * | 2/2006 | Wang | B01J 23/002 252/373 |
| 2004/0053050 A1 | 3/2004 | Guerfi et al. | |
| 2005/0022450 A1 * | 2/2005 | Tan | B01D 53/9431 48/198.3 |
| 2005/0181251 A1 | 8/2005 | Han et al. | |
| 2006/0183009 A1 | 8/2006 | Berlowitz et al. | |
| 2007/0183959 A1 * | 8/2007 | Charlier | B01J 19/088 423/447.1 |
| 2008/0263954 A1 * | 10/2008 | Hammel | B01J 23/882 48/127.9 |
| 2012/0258374 A1 | 10/2012 | Raston et al. | |

* cited by examiner

PROCESS FOR PRODUCING HYDROGEN FROM HYDROCARBONS

FIELD OF THE INVENTION

The present invention relates to a process to convert light hydrocarbons to hydrogen. In particular the present invention relates to a process to catalytically convert methane to co-produce hydrogen and graphite particles.

BACKGROUND ART

Hydrogen can be used in internal combustion engines or more favourably in proton-exchange-membrane fuel cells to generate power so that the exhaust emission is simply water vapour. Recent studies have suggested that, regardless of the source of hydrogen, a complete switch to hydrogen fuel-cell vehicles in the transportation sector would likely lead to a significant improvement in health, air quality and climate. The benefits were derived from a complete elimination of common vehicle exhaust emissions.

The study, however, did not address the effect of greenhouse gases when hydrogen was derived from fossil fuels. It is widely recognized that the conventional methods of producing hydrogen from fossil fuels invariably produce carbon dioxide (natural gas steam reforming and coal gasification) and that in the long term hydrogen has to be produced by renewable sources such as solar energy and biomass. In the short- and mid-term future when hydrogen will be derived from fossil fuels, geosequestration of carbon dioxide is technically possible but is complicated by uncertain long-term environmental ramifications.

The route from fossil fuels to hydrogen does not necessarily involve the unavoidable production of carbon oxides ($CO_x$) which fundamentally challenges the raison d'être of the hydrogen economy.

Natural gas can be solid catalytically cracked into both hydrogen gas and solid carbon according to Equation (1).

$$CH_4 \rightarrow C + 2H_2 \quad (1)$$

$\Delta H_{cracking,298K} = 74.81$ kJ/mol, $\Delta G_{cracking,298K} = 50.72$ kJ/mol However, in practice two problems prevent catalytic conversion of methane to hydrogen from being practically viable.

Firstly, the conversion efficiencies are low and the carbon generated during catalytic conversion of methane quickly deactivates the catalyst and caulks up the cracking reactor. The lifetime of the catalyst is very short, typically of the order of a few hours. It is well established that the higher the conversion efficiency of the system, the quicker the catalyst is depleted.

Secondly, the carbon generated is known to be essentially amorphous when activated carbon is used as the catalyst. The amount of amorphous carbon which would be generated would be approximately 75% of the mass of methane undergoing catalytic conversion. A huge stockpile of amorphous carbon is potentially unstable and provides disposal and management considerations.

By a judicious use of selected catalysts, it is possible to produce a spectrum of carbon quarries, such as carbon fibres and carbon nanotubes. It is possible to obtain graphitized carbon as the carbon by-product, which has an established market and is known to be very stable, but the catalyst life span is known to be short.

There is a significant need for new and improved processes for catalytic conversion of methane, and other light hydrocarbons, to hydrogen and a carbon by-product which is stable and commercially valuable.

The preceding discussion of the background art is intended to facilitate an understanding of the present invention only. It should be appreciated that the discussion is not an acknowledgement or admission that any of the material referred to was part of the common general knowledge in Australia as at the priority date of the application.

SUMMARY OF THE INVENTION

In its broadest aspect, the invention provides a process for producing hydrogen from a hydrocarbon gas, in particular a process for catalytically converting light hydrocarbons to hydrogen substantially without co-production of carbon dioxide. The present invention also provides a process for producing graphitic particles.

Additionally, the present invention also provides a process and apparatus for generating electricity from light hydrocarbons substantially in the absence of carbon dioxide emission.

Accordingly, in a first aspect of the invention there is provided a process for producing hydrogen from a hydrocarbon gas comprising contacting at elevated temperature the hydrocarbon gas with a catalyst to catalytically convert the hydrocarbon gas to hydrogen and solid carbon;

wherein, the catalyst comprises one or both of the following:

(a) a calcined Fe-containing catalyst; or
(b) a bimetallic $M_xNi_y$-type catalyst supported on a substrate.

In the preferred embodiment of the invention, M can be a transition metal or a lanthanide, preferably Mo or La as further described herein.

Previously, the hydrocarbon to hydrogen conversion process has been hindered by catalysts that are quickly caulked up reducing the efficiency or stopping such conversion reactions. However, the inventors of the present invention made the surprising and important discovery that using the catalysts described herein in the process of the invention, hydrogen is produced with a carbon product comprising graphitic particles including spherical and onion-like graphitic particles which can disassociate from the catalyst during the conversion process, thereby significantly reducing caulking through avoiding build up of carbon product on the catalyst.

In one embodiment of the invention, the hydrocarbon gas is contacted with the calcined Fe-containing catalyst at a temperature in a temperature range of from 500° C. to 1200° C. In a preferred embodiment, the hydrocarbon gas is contacted with the calcined Fe-containing catalyst at a temperature in a temperature range of from 650° C. to 1100° C. Even more preferably, the hydrocarbon gas is contacted with the calcined Fe-containing catalyst at a temperature in a temperature range of from 800° C. to 1100° C.

In some embodiments of the invention, an efficiency of the catalytic conversion with calcined Fe-containing catalyst is in a range of from about 0.3 to about 0.95. In particular, conversion efficiencies of greater than 0.4 are obtained where the elevated temperature is about 800° C. or higher. These conversion efficiencies may be sustainable over periods >50 h.

In one embodiment, the process for producing hydrogen from a hydrocarbon gas further comprises contacting the hydrocarbon gas with a calcined Fe-containing catalyst at elevated pressure to catalytically convert the hydrocarbon gas to hydrogen and solid carbon. The hydrocarbon gas may be contacted with the calcined Fe-containing catalyst at a pressure in a pressure range of from 1.75 bar to 10 bar, though greater pressures may also be utilised.

In one embodiment of the invention, the Fe-containing catalyst may be selected from a group comprising stainless steel, carbon steel, rare earth doped stainless steel, low carbon stainless steel, and iron-containing metal alloys, in particular iron-containing metal alloys with a catalytic activator. The catalytic activator may be selected from a group consisting of nickel, molybdenum, ruthenium, tantalum, lanthanide metals, and titanium.

In another embodiment the Fe-containing catalyst has a high surface area and may be mesh-like, filamentous, perforated or porous. In a preferred embodiment, the Fe-containing catalyst is a stainless steel mesh.

Prior to bringing the hydrocarbon gas into contact with the Fe-containing catalyst, said catalyst may be calcined at a temperature greater than 700° C. for a period of from about one to two hours. In some embodiments, calcinations may be conducted in the presence of moisture to accelerate corrosion on the surface of the catalyst.

After calcining, the calcined Fe-containing catalyst may be reduced at elevated temperatures, preferably in the presence of a reducing agent such as hydrogen.

Alternatively, the calcined Fe-containing catalyst may undergo reduction with methane contained in the hydrocarbon gas concurrently with the catalytic conversion of hydrocarbon gas into hydrogen and solid carbon.

In a preferred embodiment of the invention, wherein the catalyst comprises a bimetallic $M_xNi_y$-type catalyst supported on a substrate, M can be a transition metal or a lanthanide, preferably Mo or La. The MoNi-type catalyst has a formula of $Mo_xNi_yMg_zO$ wherein x=0.05-0.1, Y=0.01-0.05, and z=0.4-0.5. The LaNi-type catalyst has a formula of $La_xNi_yMg_zO$ wherein x=0.05-0.1, Y=0.01-0.1, and z=0.8-0.9.

In an embodiment of the invention, the bimetallic $M_xNi_y$-type catalyst is supported on a substrate which may display catalytic activity. Further, the substrate is mesh-like, filamentous, perforated or porous. In the preferred embodiment, the bimetallic $M_xNi_y$-type catalyst is supported on stainless steel mesh. Said substrate may comprise a calcined Fe-containing catalyst such as described herein.

In one embodiment of the invention the light hydrocarbon is contacted with the supported bimetallic $M_xNi_y$-type catalyst at a temperature of 400° C. to 950° C., and is catalytically converted to hydrogen and solid carbon. In another embodiment of the invention the light hydrocarbon is contacted with the supported bimetallic $M_xNi_y$-type catalyst at a temperature of 500° C. to 850° C., and is catalytically converted to hydrogen and solid carbon. Conversion efficiencies are typically between 30-75%, with conversion efficiencies of 50-70% observed at temperatures of 500° C. to 850° C.

Surprisingly, the above conversion efficiencies are sustainable over prolonged periods (>120 h) with negligible depletion of the bimetallic catalyst throughout the conversion process.

The light hydrocarbon may be one or more chemical compounds that contain only carbon and hydrogen, having a carbon number of 6 or less. Preferably, the light hydrocarbon is methane In a second aspect of the invention, there is provided a process for producing hydrogen from a hydrocarbon gas further comprises contacting the hydrocarbon gas with a catalyst comprising one or both of the following:

(a) a calcined Fe-containing catalyst; or
(b) a bimetallic $M_xNi_y$-type catalyst supported on a substrate;

at elevated pressure to catalytically convert the hydrocarbon gas to hydrogen and solid carbon.

The solid carbon generated in the present invention may be in the form of graphitic particles. Preferably, the solid carbon is generated in the form of substantially spherical or onion-like graphitic particles.

The spherical graphitic particles are of substantially uniform size. In general, the mean diameter of the graphitic particles is <200 nm. The diameter of the mean substantially spherical graphitic particles may also be 0.4-4 µm.

Thus, the process of the present invention further includes the step of thermally treating the recovered spherical graphitic particles and converting the amorphous carbon material to high quality graphite.

Thus, in a third aspect of the present invention there is provided a process for producing graphitic particles comprising contacting at elevated temperature hydrocarbon gas with a catalyst to catalytically convert the hydrocarbon gas to hydrogen and graphitic particles;

wherein, the catalyst comprises one or both of the following:

(a) a calcined Fe-containing catalyst; or
(b) a bimetallic $M_xNi_y$-type catalyst supported on a substrate.

While not wishing to be bound by theory, the inventors opine that the spherical or onion-like morphology of the graphitic particles formed during catalytic conversion of the light hydrocarbon facilitates ready detachment of the graphitic particles from the supported catalyst, thus preventing fouling or depletion of the catalyst and extending the period under which the catalytic conversion reaction may proceed. In this respect, the graphitic particles may be recovered in a gaseous stream comprising hydrogen and the graphitic particles.

The process of the invention may comprise the further step of thermally treating the recovered graphitic particles and converting any ambient amorphous carbon material to high quality graphite.

Additionally, the present invention also provides a process and apparatus for generating electricity from light hydrocarbons substantially in the absence of carbon dioxide emission.

In a fourth aspect of the invention there is provided a process for generating electricity from light hydrocarbons substantially in the absence of carbon dioxide emission, the process comprising the steps of:

(i) contacting at elevated temperature the hydrocarbon gas with a catalyst to catalytically convert the hydrocarbon gas to hydrogen and solid carbon;
(ii) separating and recovering the hydrogen generated in step a);
(iii) using a first portion of recovered hydrogen in a fuel cell to generate electricity; and
(iv) combusting a second portion of recovered hydrogen to generate elevated temperature in step a);

wherein, the catalyst comprises one or both of the following:

(a) a calcined Fe-containing catalyst; or
(b) a bimetallic $M_xNi_y$-type catalyst supported on a substrate.

Preferably, the process comprises the additional step of:

(v) providing hydrogen feedstock for ammonia synthesis (Haber process).

In a fifth aspect of the invention there is provided an apparatus for generating electricity from light hydrocarbons substantially in the absence of carbon dioxide emission, the apparatus comprising:
- (i) a catalytic reactor comprising a catalyst, wherein the catalytic reactor is configured to receive a hydrocarbon gas and contact said gas with said catalyst under elevated temperature to catalytically convert the hydrocarbon gas to hydrogen and solid carbon;
- (ii) a separator to separate and recover hydrogen generated in the catalytic reactor; and
- (iii) a fuel cell configured to receive and use a first portion of recovered hydrogen to generate electricity;

wherein the catalytic reactor is adapted to receive and combust a second portion of recovered hydrogen to generate elevated temperatures therein; and wherein, the catalyst comprises one or both of the following:
- (a) a calcined Fe-containing catalyst; or
- (b) a bimetallic $M_xNi_y$-type catalyst supported on a substrate.

The generation of electricity in the absence of carbon dioxide emissions by the process defined above facilitates a relative reduction in greenhouse gas emissions in comparison to prior art electricity generation processes.

According to a sixth aspect of the invention there is provided a method of creating a financial instrument tradable under a greenhouse gas Emissions Trading Scheme (ETS), the method comprising the step of exploiting a process for generating electricity from light hydrocarbons substantially in the absence of carbon dioxide emission defined by the third aspect of the invention.

In a seventh aspect of the invention there provided a method of creating a financial instrument tradable under a greenhouse gas Emissions Trading Scheme (ETS), the method comprising the step of exploiting an apparatus for generating electricity from light hydrocarbons substantially in the absence of carbon dioxide emission defined by the foregoing aspect of the invention.

Preferably, the financial instrument comprises one of either a carbon credit, carbon offset or renewable energy certificate.

DETAILED DESCRIPTION OF THE PREFERRED EMBODIMENTS OF THE INVENTION

General

Figure 1:
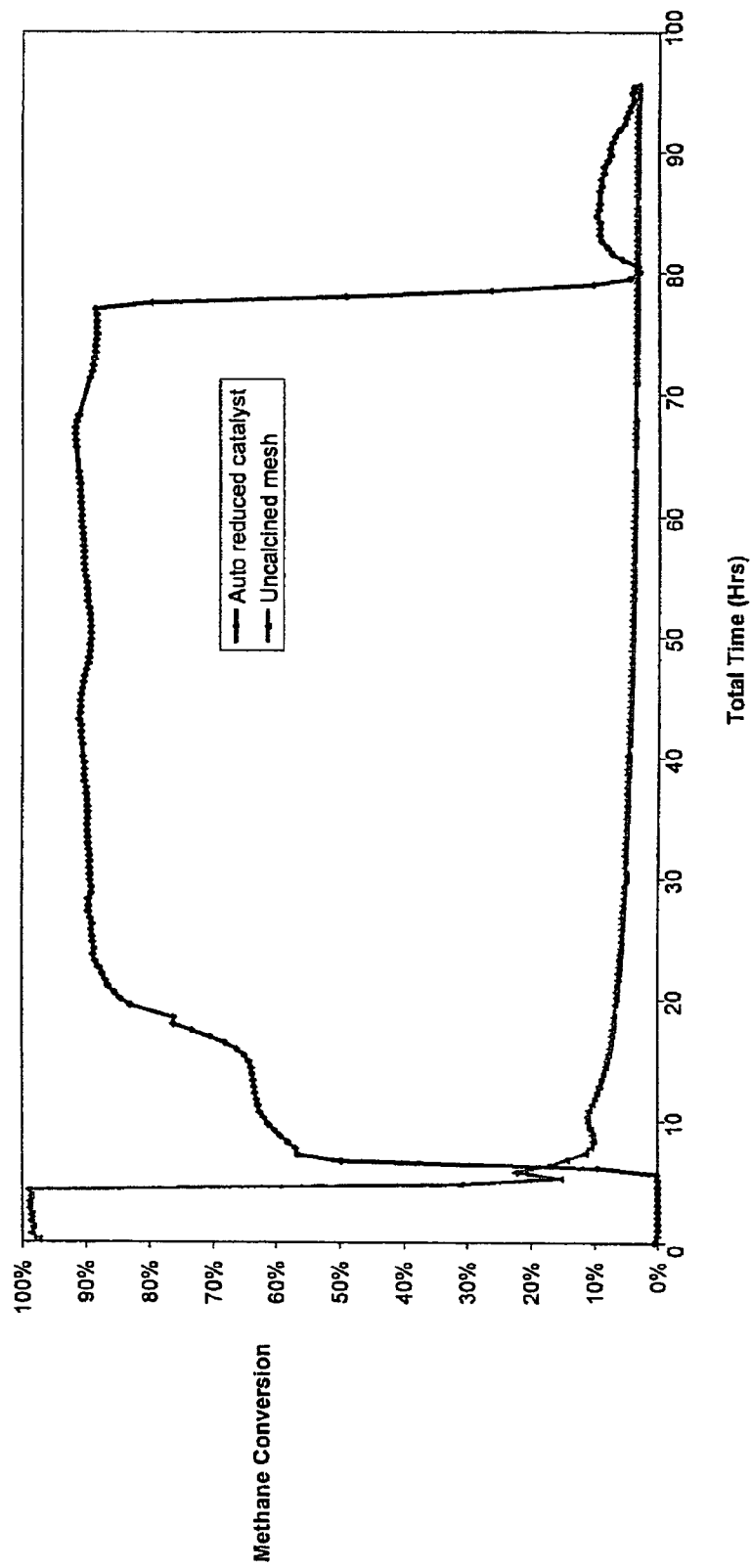
FIG. 1 shows a graphical representation of methane conversion efficiencies of a calcined catalyst which has undergone autoreduction with methane and an uncalcined catalyst over a prolonged period.

Those skilled in the art will appreciate that the invention described herein is susceptible to variations and modifications other than those specifically described. The invention includes all such variation and modifications. The invention also includes all of the steps, features, formulations and compounds referred to or indicated in the specification, individually or collectively and any and all combinations or any two or more of the steps or features.

Each document, reference, patent application or patent cited in this text is expressly incorporated herein in their entirety by reference, which means that it should be read and considered by the reader as part of this text. That the document, reference, patent application or patent cited in this text is not repeated in this text is merely for reasons of conciseness. None of the cited material or the information contained in that material should, however be understood to be common general knowledge.

Manufacturer's instructions, descriptions, product specifications, and product sheets for any products mentioned herein or in any document incorporated by reference herein, are hereby incorporated herein by reference, and may be employed in the practice of the invention.

The present invention is not to be limited in scope by any of the specific embodiments described herein. These embodiments are intended for the purpose of exemplification only. Functionally equivalent products, formulations and methods are clearly within the scope of the invention as described herein.

The invention described herein may include one or more range of values (e.g. size, concentration etc). A range of values will be understood to include all values within the range, including the values defining the range, and values adjacent to the range which lead to the same or substantially the same outcome as the values immediately adjacent to that value which defines the boundary to the range.

Throughout this specification, unless the context requires otherwise, the word "comprise" or variations such as "comprises" or "comprising", will be understood to imply the inclusion of a stated integer or group of integers but not the exclusion of any other integer or group of integers.

Other definitions for selected terms used herein may be found within the detailed description of the invention and apply throughout. Unless otherwise defined, all other scientific and technical terms used herein have the same meaning as commonly understood to one of ordinary skill in the art to which the invention belongs.

The term 'M' as used herein, is intended to mean 'metal'.

Reference to cited material or information contained in the text should not be understood as a concession that the material or information was part of the common general knowledge or was known in Australia or any other country.

Throughout the specification and claims, unless the context requires otherwise, the word "comprise" or variations such as "comprises" or "comprising", will be understood to imply the inclusion of a stated integer or group of integers but not the exclusion of any other integer or group of integers.

Features of the invention will now be discussed with reference to the following non-limiting description and examples.

In a general form, the invention relates to a process for producing hydrogen from a hydrocarbon gas, in particular a process for catalytically converting light hydrocarbons to hydrogen substantially without co-production of carbon dioxide.

The hydrocarbon gas may be any gas stream that comprises light hydrocarbons. Illustrative examples of hydrocarbon gas include, but are not limited to, natural gas, coal seam gas, associated gas, landfill gas, and biogas. The composition of the hydrocarbon gas may vary significantly but it will generally comprise one or more light hydrocarbons from a group comprising methane, ethane, ethylene, propane, and butane.

While each of the foregoing light hydrocarbons may undergo catalytic conversion to hydrogen substantially without coproduction of carbon dioxide, in accordance with the process of the present invention, methane almost always exists in the highest concentration in the foregoing gas streams.

Accordingly, it will be appreciated that in a preferred embodiment of the invention, the hydrocarbon gas substantially comprises methane.

The process for producing hydrogen from a hydrocarbon gas comprises contacting at elevated temperature the hydrocarbon gas with a catalyst to catalytically convert the hydrocarbon gas to hydrogen and solid carbon, wherein the catalyst comprises one or both of the following:
  (a) a calcined Fe-containing catalyst; or
  (b) a bimetallic $M_xNi_y$-type catalyst supported on a substrate.

The process of the present invention may be conducted in a catalytic reactor of a type known to those skilled in the art. The catalyst may be disposed in a reaction portion of the catalytic reactor in a manner in which the hydrocarbon gas can be contacted with the catalyst. For example, the catalyst may be disposed in within the reaction portion of the catalytic reactor and subjected to a flow of hydrocarbon gas therethrough. Alternatively, the catalyst may be suspended in a bed of quartz wool disposed within the reaction portion of the catalytic reactor and subjected to a flow of hydrocarbon gas therethrough.

In a preferred embodiment of the invention, hydrocarbon gas may be contacted with calcined Fe-containing catalyst at a temperature in a temperature range of from 500° C. to 1200° C., preferably at a temperature in a temperature range of from 650° C. to 1100° C., and even more preferably at a temperature in a temperature range of from 800° C. to 1100° C.

One of the most significant advantages of the present invention is the improved conversion efficiency of the process. Conversion efficiencies, as shown in FIG. 1, are typically in a range of from about 0.3 to about 0.95.

In particular, conversion efficiencies of greater than 0.4 are obtained where the elevated temperature is about 800° C. or higher.

Surprisingly, in contrast to the prior art, the above conversion efficiencies are sustainable over prolonged periods (>50 h) throughout the process. Conversion efficiencies are sustainable for periods of up to 320 h and appear to be limited only by caulking up of the calcined Fe-containing catalyst by solid carbon deposits thereon which prevents any further passage of hydrocarbon gas through said catalyst.

The inventors have found that conducting the process under pressure also improves the conversion efficiencies of the reaction described in Equation (1). The improvement in conversion efficiency is surprising because one would expect that pressurization would lower the thermodynamic limiting efficiency. However, while not wishing to be bound by theory, the inventors opine that pressurization has an ameliorating effect on the kinetics of the reaction described in Equation (1) Therefore, the process for producing hydrogen from a hydrocarbon gas may further comprise contacting the hydrocarbon gas with a calcined Fe-containing catalyst at elevated pressure to catalytically convert the hydrocarbon gas to hydrogen and solid carbon. The hydrocarbon gas may be contacted with the calcined Fe-containing catalyst at a pressure in a pressure range of from 1.75 bar to 10 bar, though greater pressures may also be utilised.

The Fe-containing catalyst may be selected from a group comprising stainless steel, carbon steel, rare earth doped stainless steel, low carbon stainless steel, and iron-containing metal alloys, in particular iron-containing metal alloys with a catalytic activator. The catalytic activator may be selected from a group consisting of nickel, molybdenum, ruthenium, tantalum, lanthanide metals, and titanium.

The calcined Fe-containing catalyst may be mesh-like, perforated, porous or filamentous. The topology of the substrate is chosen to facilitate passage of a stream of light hydrocarbon therethrough, provide a large surface area:mass ratio, and allow efficient mass-heat transfer during the process of the present invention.

Additionally, the preferred topologies for the substrate facilitate ready separation of solid carbon from said catalyst either during or after the catalytic conversion process, thereby preventing fouling of said catalyst over prolonged reaction periods. In a preferred embodiment, the Fe-containing catalyst is a stainless steel mesh, such as for example a 316 stainless steel mesh.

The catalyst may be prepared by calcining it at a temperature greater than 700° C. for a period of from about one to two hours. In some embodiments, calcination may be conducted in the presence of moisture to accelerate corrosion on the surface of the catalyst. In a typical calcination, the catalyst may be subjected to a 1 hour period in which it is heated to a temperature greater than 700° C., whereupon it is held at that temperature for a 2 h period, and then allowed to cool to ambient temperature over an 18-24 h period.

Prior to calcining, the catalyst may be optionally treated to prepare the surface of the catalyst. Oily residues and contaminants may be removed, for example, by washing the catalyst in a solvent such as ethanol, optionally in an ultrasound bath for a short period of time (5-15 min), then washing in distilled water. Additionally, the surface of the catalyst may be etched with acid (e.g. 30 vol % nitric acid at 80 C) then washed with distilled water.

While not wishing to be bound by theory, the inventors assert that calcining the catalyst advantageously creates a greater surface area on the catalyst, therefore improving the efficiency of the catalytic conversion of light hydrocarbons to hydrogen and carbon. It is thought that calcining the catalyst desensitises the catalyst material, facilitates the separation of iron and chromium metal atoms in the solid FeCr solution of the alloy and the diffusion of Fe in the form of iron oxides ($Fe_2O_3/FeO$), or as mixed FeCr oxide species to the surface of the catalyst. In this way, the crystallinity of iron oxides and mixed metal oxides at the surface of the catalyst is increased, thereby resulting in an increased surface area available for catalysis.

Furthermore, the increased crystallinity of iron oxides or mixed metal oxides at the surface of the catalyst is also thought to provide additional sites on which solid carbon particles may grow during catalytic conversion of the hydrocarbon gas.

After calcining, the calcined Fe-containing catalyst may be reduced at elevated temperatures, preferably in the presence of a reducing agent such as hydrogen.

Alternatively, the calcined Fe-containing catalyst may undergo reduction with methane contained in the hydrocarbon gas concurrently with the catalytic conversion of hydrocarbon gas to hydrogen and solid carbon.

The current production methods for formation of graphitic particles having an onion-like morphology (sometimes referred to as Bucky onions) are exceptionally expensive and energy intensive. Such materials may have ready application as solid state lubricants for wear prevention, anti-corrosion agents, particularly in high temperature applications such as in the aerospace industry, solid fuel propellants, and as a substrate for lithium ion intercalation as found in lithium ion batteries.

Serendipitously, the inventors have found that by employing the process of the present invention it is also possible to co-produce solid carbon in the form of graphitic particles, in particular solid carbon in the form of onion-like graphitic particles. The term "onion-like" as used herein refers to a plurality of substantially concentric polyhedric or spherical shells.

The term may include continuous or fragmented shells and may be based upon fullerene-type graphitic material.

Figure 2:
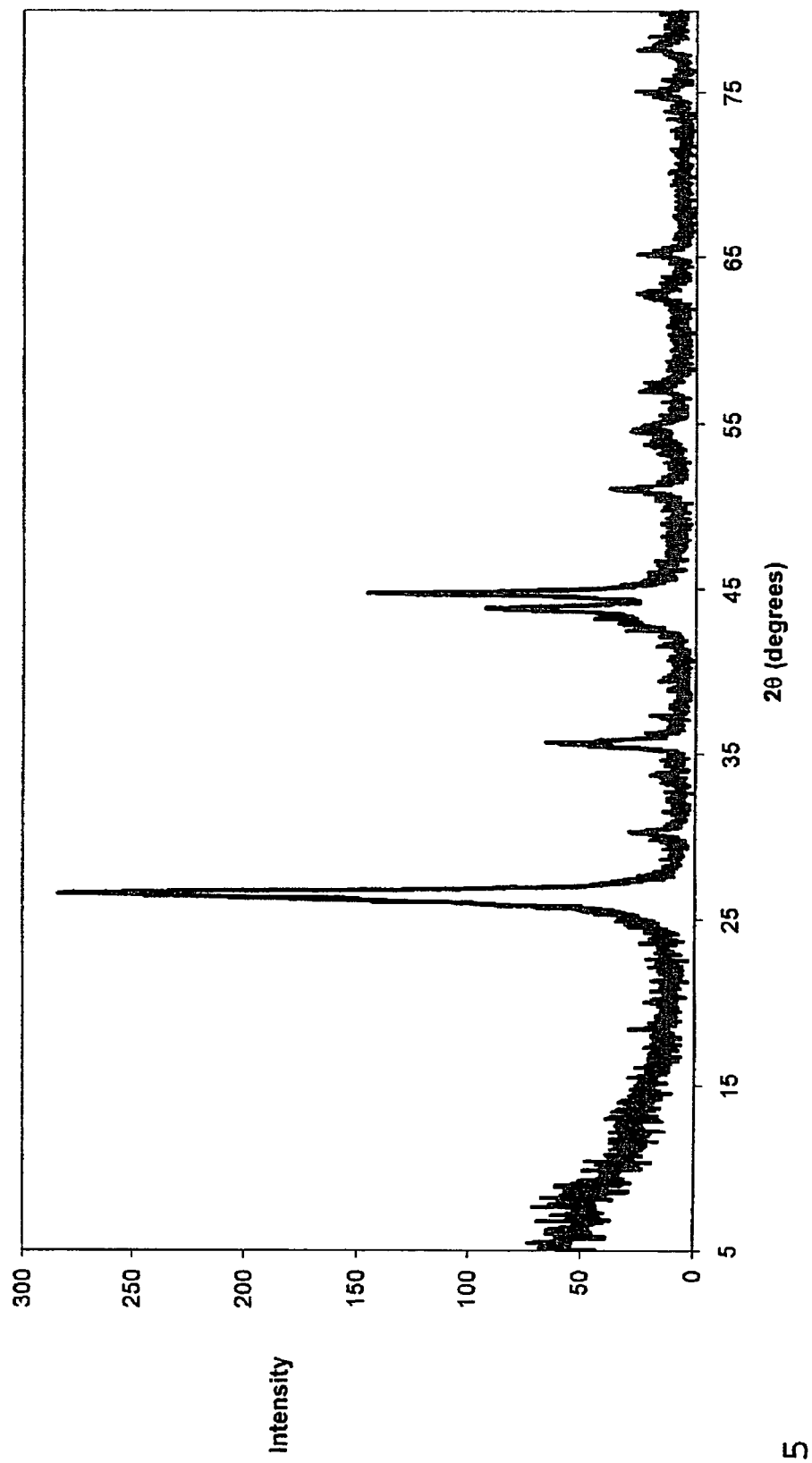
FIG. 2 is an X-ray diffraction (XRD) pattern of graphitic carbon particles produced with the calcined catalyst described with reference to FIG. 1.
Figure 3:
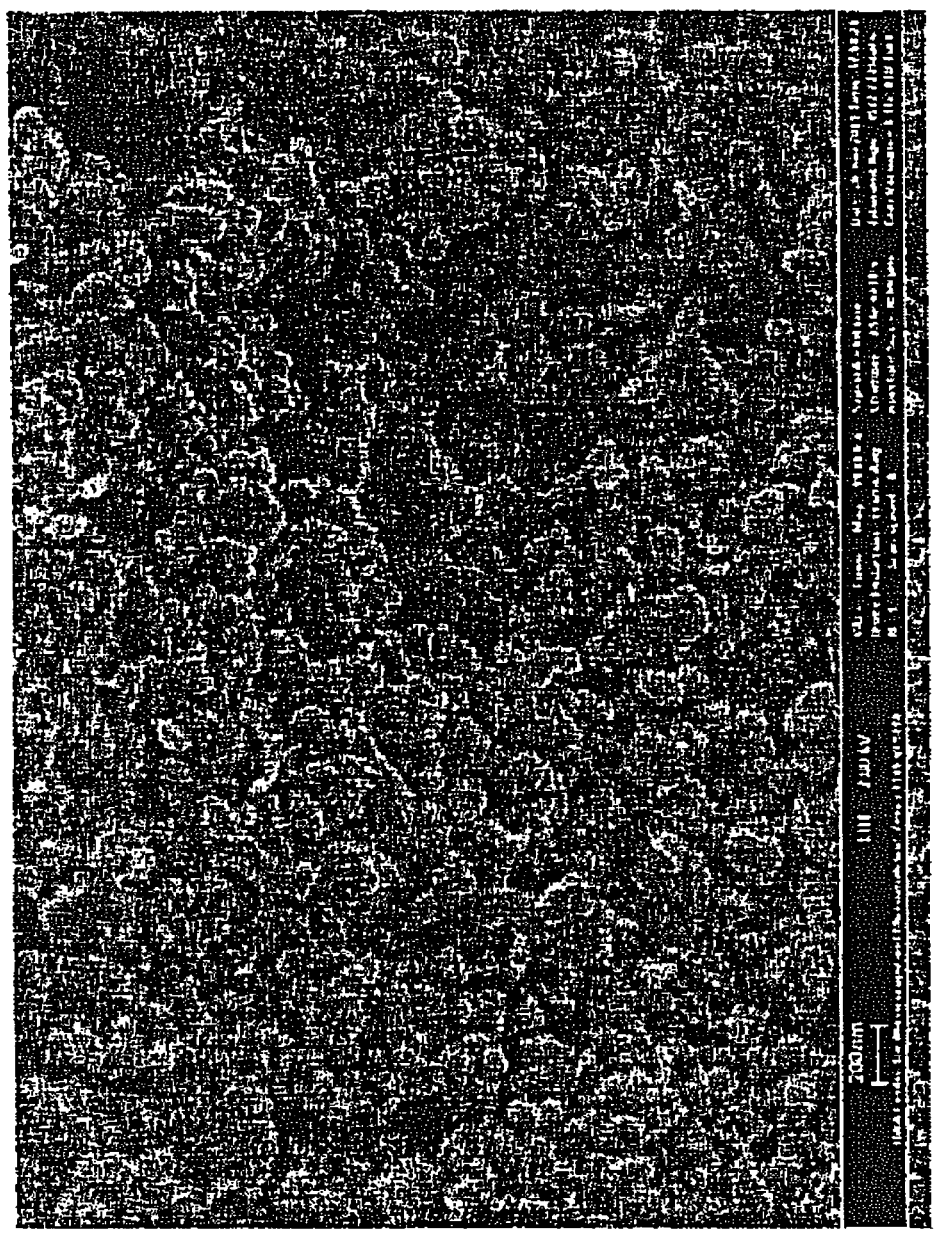
FIG. 3 is a Scanning Electron Micrograph (SEM) of 200 nm onion-like graphitic particles produced in accordance with the process of the present invention.

FIGS. 2 and 3 are an X-ray diffraction (XRD) pattern and scanning electron microscope (SEM) micrograph, respectively, of solid carbon generated on the surface of the catalyst used in the catalytic conversion of methane to hydrogen.

The XRD pattern confirms that the solid carbon is in a $Sp^3\_Sp^2$ hybridised state and that it has a highly graphitic character.

The SEM micrograph demonstrates that the graphitic particles substantially have an onion-like morphology, although a small amount of filamentous graphite is also present in the sample. It is evident from FIG. 3 that the graphitic particles are of generally uniform size.

Typically, the mean diameter of the graphitic particles is <200 nm.

The graphitic particles may be harvested in a batchwise manner by detaching them from the catalyst when the catalytic conversion reaction has reached completion.

It will be appreciated that continuous harvesting of the graphitic particles as they are generated on the surface of the catalyst throughout the catalytic conversion process may result in the further lengthening of the period under which the catalytic conversion process may proceed.

Additionally, the present invention also provides a process and apparatus for generating electricity from hydrocarbon gas substantially in the absence of carbon dioxide emission.

Figure 4:
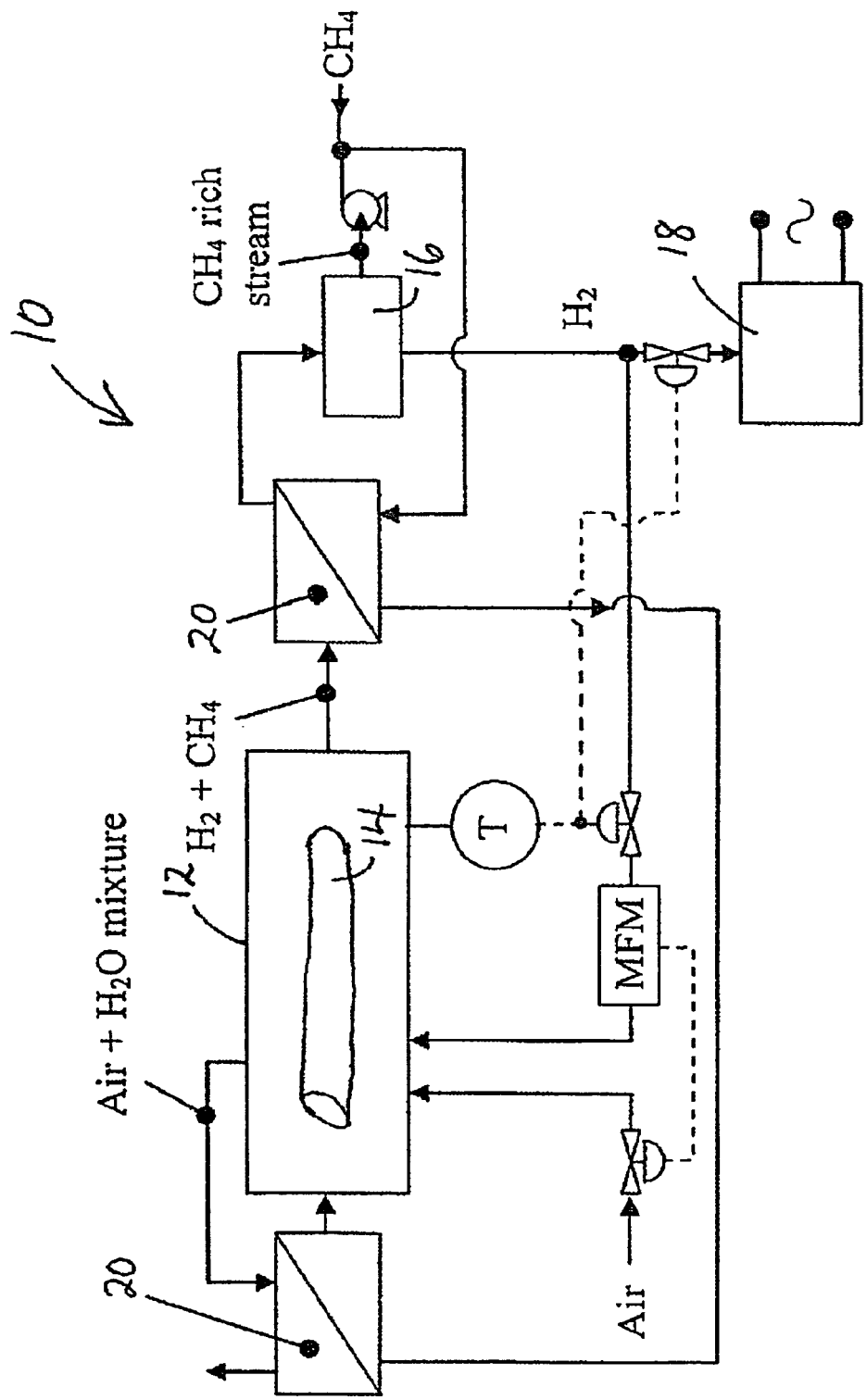
FIG. 4 is a schematic representation of an apparatus for generating electricity from light hydrocarbons substantially in the absence of carbon dioxide emission.

Referring to FIG. 4, there is shown an apparatus 10 for generating electricity from hydrocarbon gas substantially in the absence of carbon dioxide emission.

The apparatus 10 includes a catalytic reactor 12 provided with a calcined Fe-containing catalyst 14, a separator 16 to separate and recover hydrogen generated in the catalytic reactor, a fuel cell 18 configured to receive and use a first portion of recovered hydrogen to generate electricity, and one or more heat exchangers 20. Illustrative examples of heat exchangers suitable for the apparatus include, but are not limited to, boiler economisers.

The catalytic reactor 12 is configured to receive a hydrocarbon gas and contact said gas with said catalyst under elevated temperature to catalytically convert the hydrocarbon gas to hydrogen and solid carbon.

The catalytic reactor 12 is also configured to receive and combust a second portion of recovered hydrogen to generate elevated temperatures therein. The second portion of recovered hydrogen is combined with an amount of air that is about 10% in excess of the stoichiometric amount required to ensure complete combustion. The heat released at temperature T per mole of hydrogen is given by:

$$Q_T = \Delta h_{combustion, 298K} + \sum_j \phi_i R \left[ A_i(T-298) + \frac{B_i}{2}(T^2 - 298^2) - D_i\left(\frac{1}{T} - \frac{1}{298}\right) \right]$$

where i refers to $H_2O$, $O_2$ and $N_2$ respectively, $\phi_{H2O}=1$ $\phi_{O2},=0.05$, and $\phi_{N2},=(0.79 10.21)0.55$. The coefficients $A_i$, $B_i$, and $D_i$ can be found in Table 1.

TABLE 1

Coefficients A, B, C and D for the $CH_4$, C, $H_2$, $H_2O$, $O_2$ and $N_2$.

| | A | B | C | D |
|---|---|---|---|---|
| $CH_4$ | 1.702 | $9.081 \times 10^{-3}$ | $-2.164 \times 10^{-6}$ | 0 |
| C (graphite) | 2.063 | $5.140 \times 10^{-4}$ | 0 | $-1.057 \times 10^5$ |
| $H_2$ | 3.249 | $4.220 \times 10^{-4}$ | 0 | $8.300 \times 10^3$ |
| $H_2O$ (vapour) | 3.470 | $1.45 \times 10^{-3}$ | 0 | $0.121 \times 10^5$ |
| $O_2$ | 3.639 | $0.506 \times 10^{-3}$ | 0 | $-0.227 \times 10^5$ |

In general, a combustion temperature greater than the cracking temperature is required, as the excess heat will cater for conduction and radiation heat losses within the catalytic reactor 12 during the catalytic conversion reaction. Accordingly, the amount of recovered hydrogen required to support the combustion can be calculated as:

$$n_{H_2} = \frac{1.15\left\{\Delta h_{combustion,T} + \left[A_{CH_4}(30) + \frac{B_{CH_4}}{2}[T^2 - (T-30)^2] - D_{CH_4}\left(\frac{1}{T} - \frac{1}{T-30}\right)\right]\right\}}{Q_{(T+100)k}} \quad (3)$$

It will be appreciated that one or more economizers 20 may be installed as required to bring the temperature of approach of the recovered methane rich stream to within 30° C. of the cracking temperature. The hydrocarbon gas may be passed through the catalytic reactor 12 and contacted with the calcined Fe-containing catalyst 14 under elevated temperature to catalytically convert the hydrocarbon gas to hydrogen and solid carbon as described in the foregoing specification.

In practice, it is unlikely that there will be complete conversion of all the hydrocarbon gas passing through the catalytic reactor 12 in a single pass, and therefore a mixture of hydrogen and methane is withdrawn from the reactor 12 and passed to the separator 16 to separate and recover the hydrogen generated in the catalytic reactor 12. The separator 16 may be any separator suitable for separating and recovering hydrogen from a gaseous mixture of methane and hydrogen. An illustrative example of a suitable separator 16 includes a pressure swing adsorption separator.

A portion of the recovered hydrogen is directed to the catalytic reactor 12 where it is combusted as has been previously described. The remaining portion of the recovered hydrogen is directed to a fuel cell to generate electricity. The methane (or light hydrocarbon) rich stream from the separator 16 is pressurized and recycled back to the catalytic reactor 12 to reduce hydrocarbon gas losses.

Figure 5:
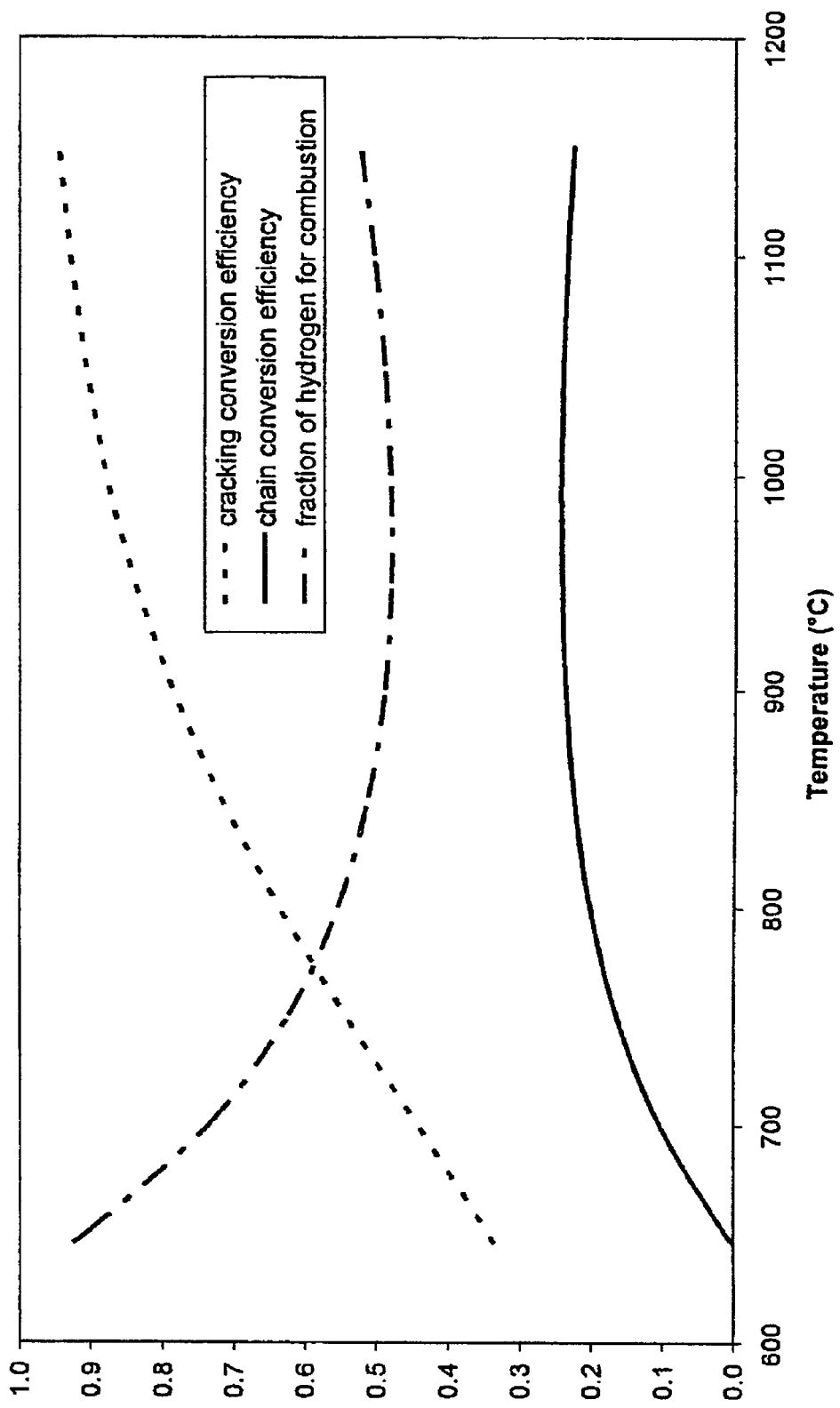
FIG. 5 shows a graphical representation of cracking efficiency, chain efficiency and fraction of recovered hydrogen used for combustion versus cracking temperature.

In FIG. 5, the catalytic cracking efficiency, overall methane to electricity conversion efficiency (chain conversion efficiency) and the fraction of hydrogen needed for combustion as functions of cracking temperature are described.

The chain conversion efficiency for overall methane to electricity conversion is defined as the ratio of the net electrical power generated from the methane-to-hydrogen-and-then-to electricity process to the heat of reaction available from the following reaction:

$$CH_4 + O_2 \rightarrow C + 2H_2O \quad (4)$$

Heat of reaction at 298 K=−408.83 kJ/mol

The threshold temperature that makes the process viable is about 646° C. The overall efficiency curve exhibits a broad optimum range where it is possible to both enhance the graphitic nature of the carbon and achieve near maximum overall conversion of methane into electricity at about 24%. At about the broad optimum conversion efficiency, 48% to 49% of the hydrogen produced is needed for combustion.

In a further embodiment of the invention, the catalyst is a bimetallic $M_xNi_y$-type catalyst supported on a substrate, where M is Mo or La. The MoNi-type catalyst has a formula of $Mo_xNi_yMg_zO$ wherein x=0.05-0.1, Y=0.01-0.05 and z=0.4-0.5. The LaNi-type catalyst has a formula of $La_xNi_yMg_zO$ wherein x=0.05-0.1, Y=0.01-0.1, and z=0.8-0.9.

Preferably, the substrate is mesh-like, perforated, porous or filamentous. The topology of the substrate is chosen to facilitate passage of a stream of light hydrocarbon therethrough, provide a large surface area:mass ratio, and allow efficient mass-heat transfer during the process of the present invention.

Additionally, the preferred topologies for the substrate facilitate ready separation of solid carbon from the substrate-supported catalyst either during or after the catalytic conversion process, thereby preventing fouling of the catalyst over prolonged reaction periods.

In this particular embodiment, the bimetallic $M_xNi_y$-type catalyst is supported on a stainless steel mesh such as for example 100 mesh 55304 and 88316. The bimetallic $M_xNi_y$— type catalyst can also be supported on nickel mesh.

Additionally, it is thought the conversion efficiency of the process of the invention may be assisted by catalytic activity demonstrated by the supporting substrate.

The bimetallic $M_xNi_y$-type catalyst is prepared by loading a catalyst precursor solution onto the surface of the substrate, and then converting the catalyst precursor to the bimetallic $M_xNi_y$— type catalyst by heat treatment under reducing conditions.

Typically, a surface of the substrate is treated before the catalyst precursor solution is loaded onto the surface of the substrate. The surface of the substrate is roughened to increase its surface area and improve adhesion of the catalyst precursor solution, and later the bimetallic $M_xNi_y$-type catalyst, to the surface of the substrate. With respect to the stainless steel mesh substrate, the surface of the mesh strands can be adequately roughened by purging the mesh with fine sands.

The roughened surface is then treated in a dilute acid bath to clean the surface and to form an acid salt film thereon prior to treatment with a catalyst precursor solution. For example, the substrate may be dipped into a hot diluted nitric acid solution for about 10 seconds. In this way, a nitrate film is formed over the surface of the substrate.

The catalyst precursor solution comprises stoichiometric concentrations of Ni and M salts. In respect of the $La_xNi_y$-type catalyst, the catalyst precursor solution typically comprises stoichiometric concentrations of nitrate salts of Ni and La, such as for example $Ni(NO_3)_2$, $La(NO_3)_3$, in an aqueous weak acid solution, such as for example, citric acid. Citric acid also plays an important role in the gel formation. Typically, the concentration of nitric acid in the catalyst precursor solution is about 5%. In respect of the $Mo_xNi_y$-type catalyst the catalyst precursor solution typically comprises stoichiometric concentration of ammonium molybdate and $Ni(NO_3)_2$.

The catalyst precursor solution is prepared by dissolving the Ni and M salts at desired stoichiometric concentrations in the aqueous acid solution, typically with stirring at ambient temperature for 5 h and at 60° C. for 2 h. Typically, the total initial metals concentration is about 0.1 M. The catalyst precursor solution is then stirred at 80° C. until the solution becomes a homogenous viscous syrup.

The treated substrate is coated with the viscous catalyst precursor solution, dried at 80° C. for 1 h under an inert atmosphere, and then calcined at 800° C. in air for 5 h to form the oxidized $M_xNi_y$-type catalyst.

It is preferable to remove weakly attached $M_xNi_y$-type catalyst from the substrate. Typically, the weakly attached $M_xNi_y$-type catalyst can be removed from the substrate by gently puffing the substrate with compressed air and washing in an ultrasonic bath.

Interestingly, the inventors have noted that the MoNi-type catalyst appeared to be more strongly attached to the stainless steel mesh substrate than the LaNi-type catalyst.

Preferably, the loaded catalyst is then treated in a stream of diluted hydrogen (5% $H_2$ in nitrogen) for 1 h at 600° C. to obtain metallic active sites.

Figure 6A:
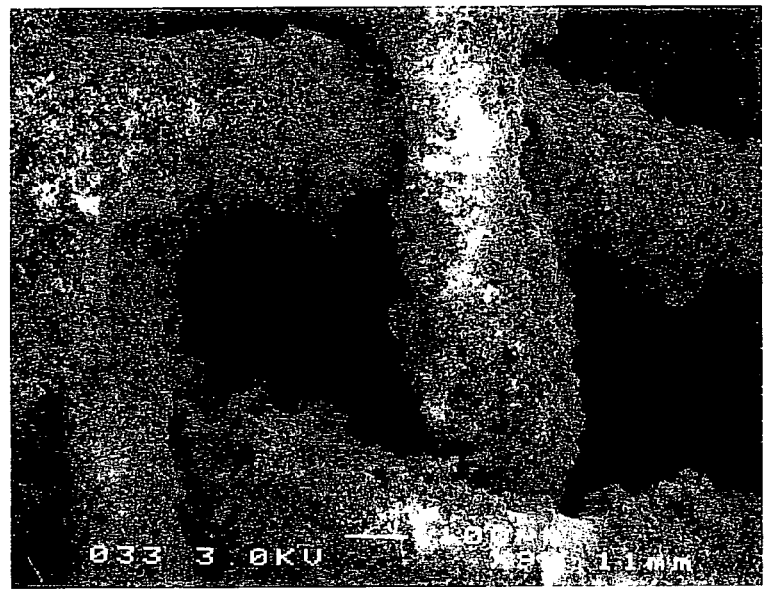
FIGS. 6a and 6b show two Scanning Electron Micrographs (SEM) of a bimetallic $M_xNi_y$-type catalyst supported on a stainless steel mesh magnified ×90 and ×200, respectively.
Figure 6B:
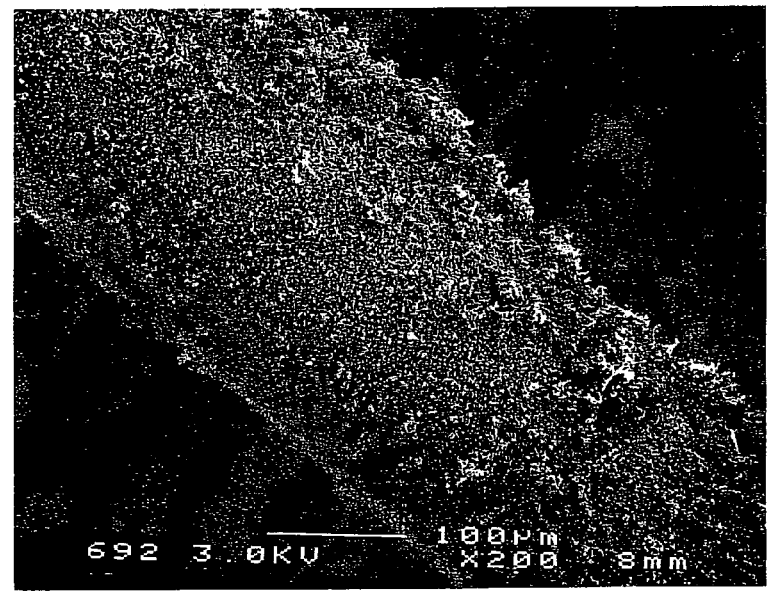

FIGS. 6a and 6b show two Scanning Electron Micrographs (SEM) of a bimetallic $M_xNi_y$-type catalyst supported on a stainless steel mesh magnified ×90 and ×200, respectively.

The catalytic conversion process of the present invention is conducted in a reactor of a type known to those skilled in the art.

The supported bimetallic catalyst is disposed in a reaction portion of the reactor in a manner in which the light hydrocarbon can be contacted with the supported bimetallic catalyst. For example, the supported bimetallic catalyst can be disposed on a substantially horizontal surface of the reactor and subjected to a transverse flow of light hydrocarbon at about 1 atm.

Alternatively, the supported bimetallic catalyst can be suspended in a bed of quartz wool disposed within an interior of the reactor and subjected to a longitudinal flow of light hydrocarbon at about 1 atm.

The catalytic conversion process of the present invention can be conducted at alternative pressures, and indeed subatmospheric pressures favour the equilibrium position of the reaction:

$$CH_4 \rightarrow 2H_2 + C \qquad (5)$$

Nevertheless, lower and upper limits of the operating pressure will be determined by mass transfer effects and limitations in the reactor design. On the other hand, elevated pressures may improve the quality of the graphitic by-product.

The process of the present invention can be conducted at temperatures of 400° C. to 950° C., preferably at temperatures of 500° C. to 850° C.

One of the most significant advantages of the present invention is the improved conversion efficiency of the process. Conversion efficiencies, as shown in FIG. 7, are typically between 30-75%, with conversion efficiencies of 55-70% typically observed at temperatures of 500° C. to 850° C.

Figure 7:
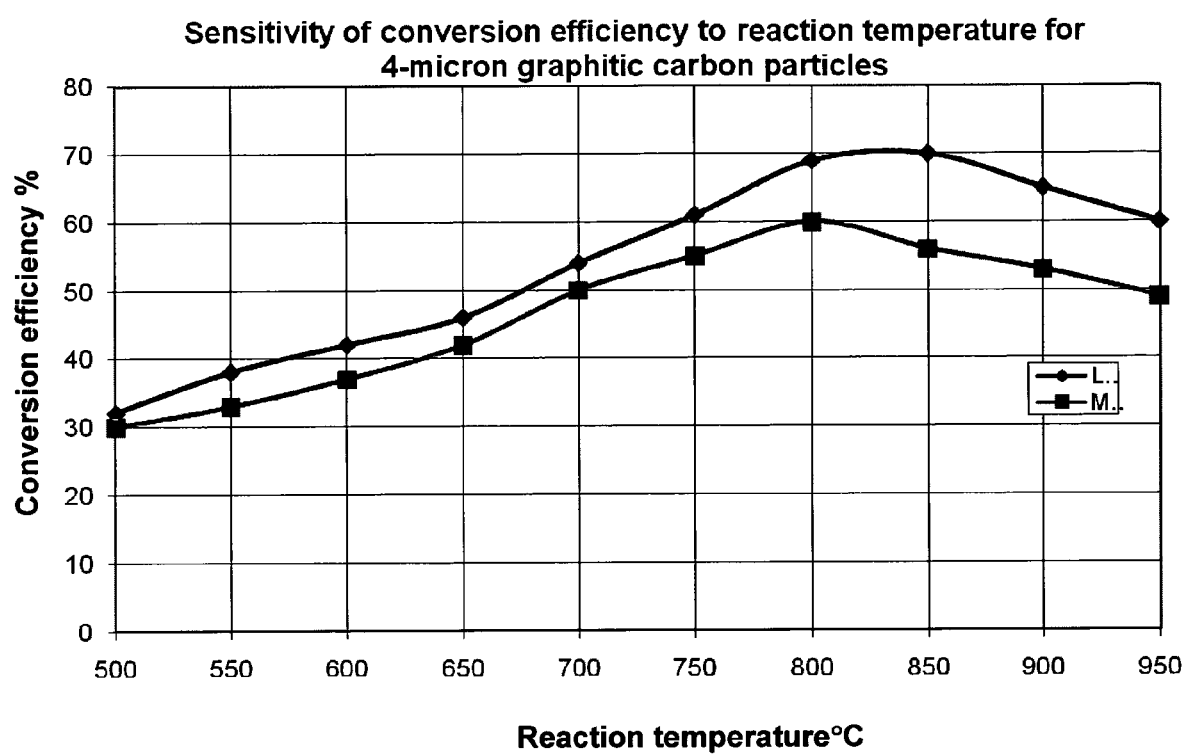
FIG. 7 shows the conversion efficiencies of the LaNi-type and MoNi-type catalysts at different temperatures.
Figure 8:
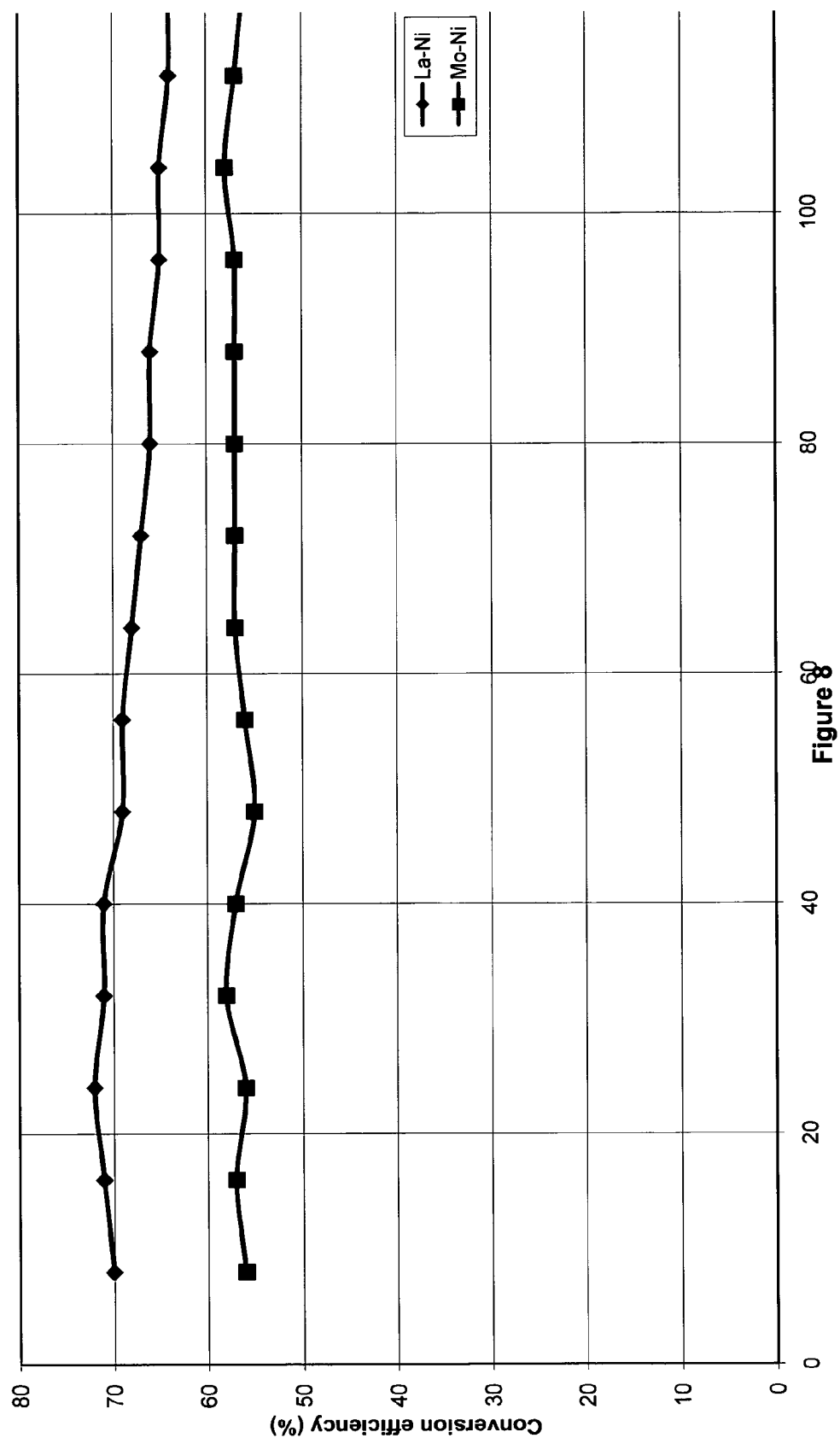
FIG. 8 shows the lifespan analysis of the LaNi-type and MoNi-type catalysts.
Figure 9:
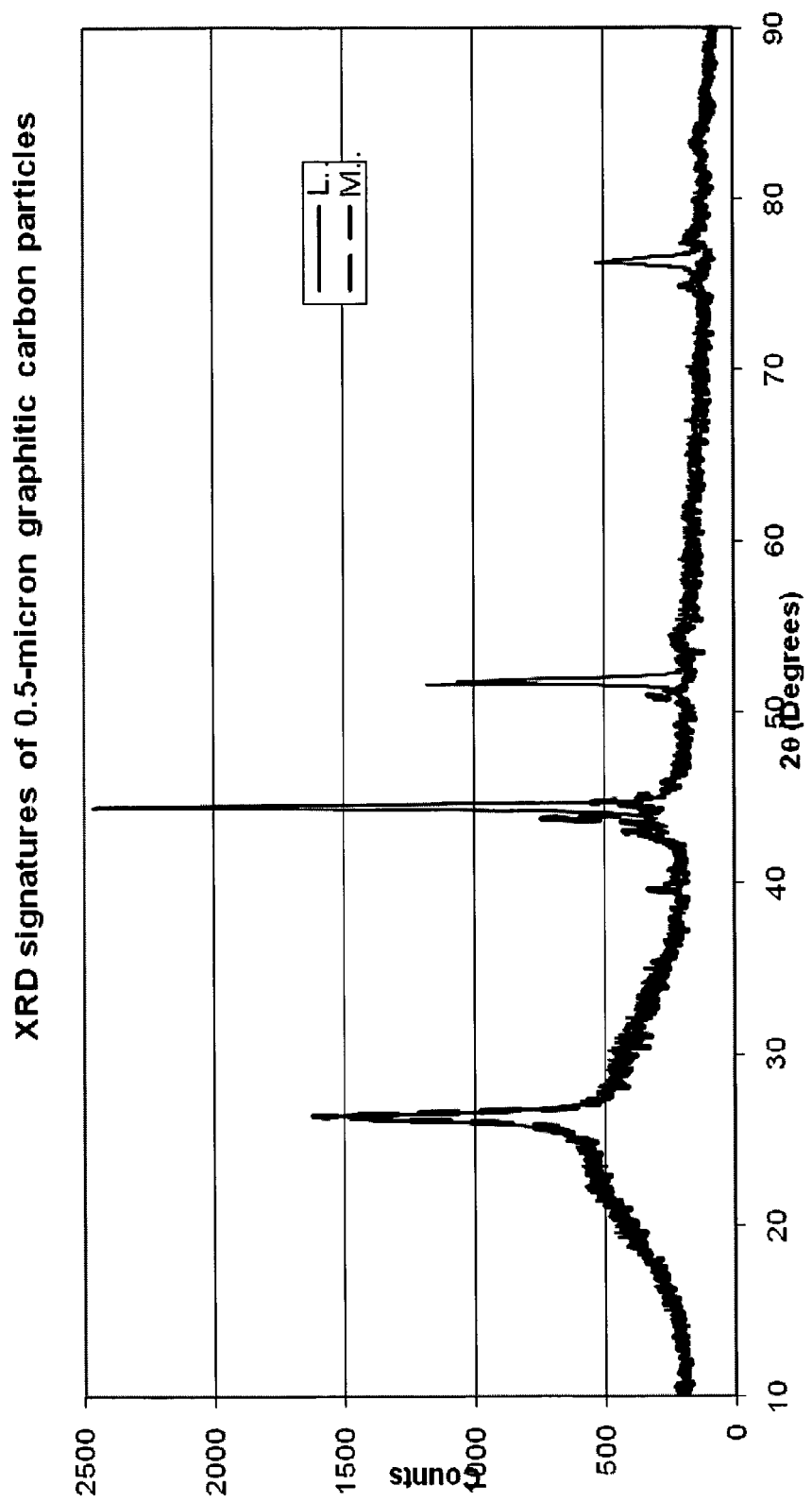
FIG. 9 shows X-ray diffraction (XRD) signatures of 0.5 µm graphitized carbon particles produced with LaNi-type and MoNi-type catalysts.

The inventors have noted that the LaNi-type catalyst demonstrates about 10-15% higher conversion efficiency than the MoNi-type catalyst (FIGS. 7 & 8). Furthermore, use of the LaNi-type catalyst affords a higher degree of graphitisation in the resulting solid carbon by-product (FIG. 9).

Surprisingly, the above conversion efficiencies are sustainable over prolonged periods (>120 h) with negligible depletion of the bimetallic catalyst throughout the conversion process (FIG. 8).

Serendipitously, the inventors have found that by employing the process of the present invention it is also possible to co-produce solid carbon in the form of substantially spherical particles of graphite.

Figure 10:
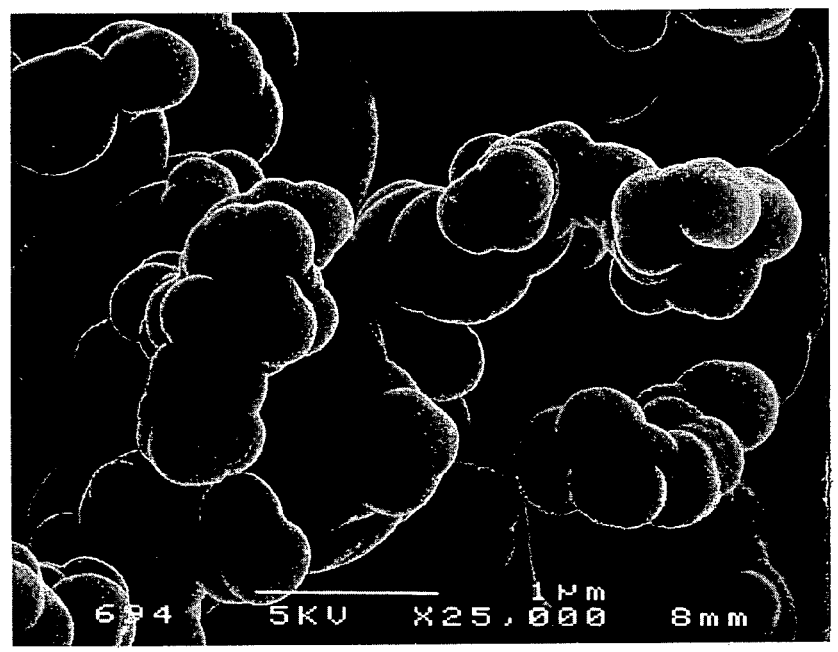
FIG. 10 shows a Scanning Electron Micrograph (SEM) of 0.5 µm globular particles of highly graphitized carbon magnified ×25,000, produced in accordance with the process of the present invention.
Figure 11:
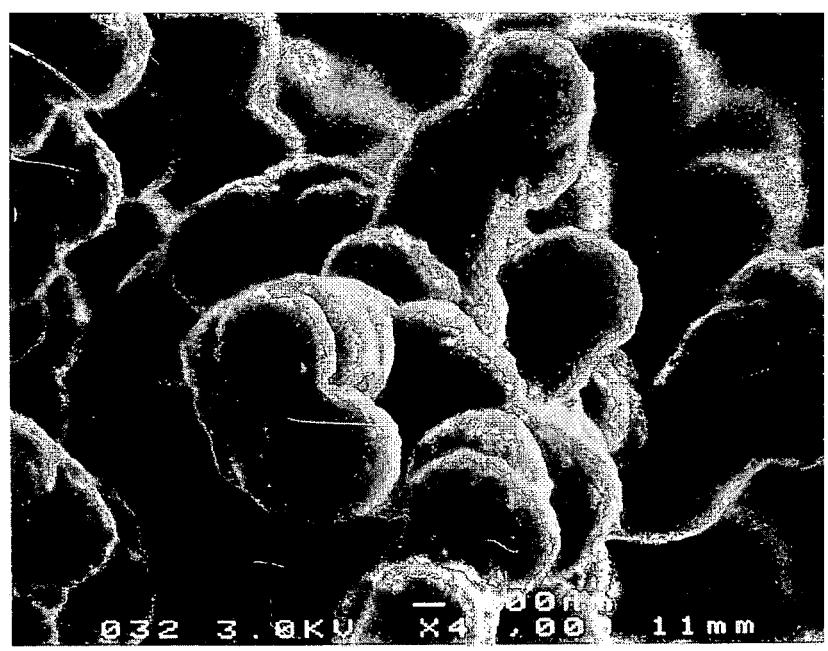
FIG. 11 shows a SEM of the particles shown in FIG. 10 magnified ×40,000.
Figure 12:
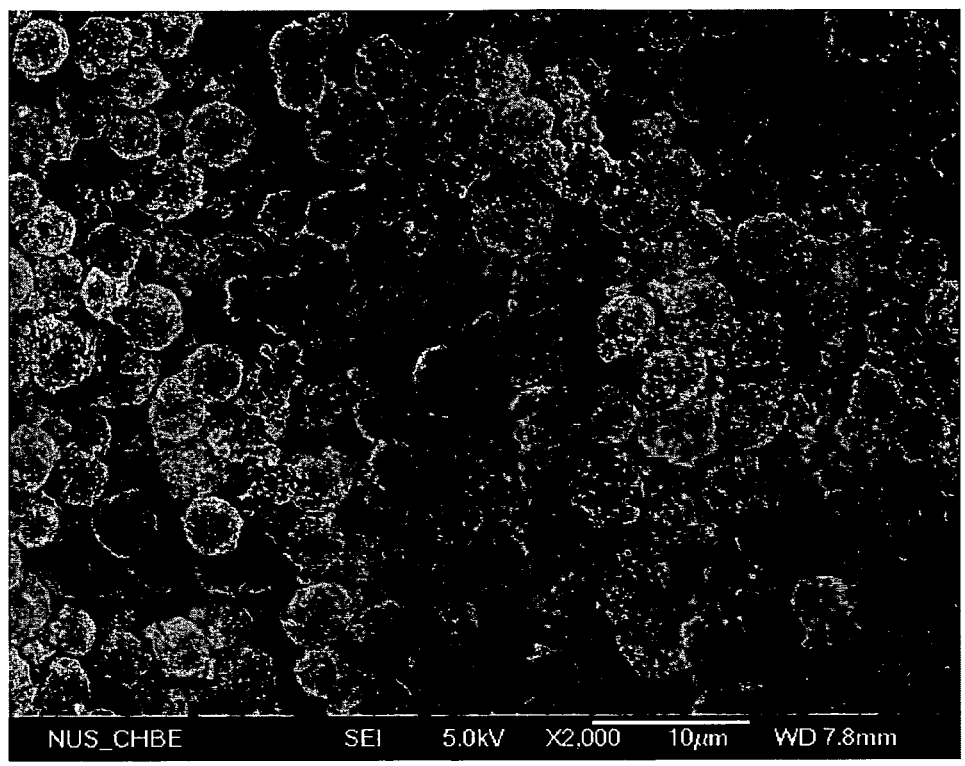
FIG. 12 shows a SEM of 4 µm spherical particles of graphitic carbon magnified ×2,000, produced in accordance with the process of the present invention.

It is evident from FIGS. 10 to 12 that the spherical graphitic particles are of generally uniform size. Typically, the mean diameter of the spherical graphitic particles is 0.5-4 µm.

The inventors have noted that the mean diameter of the spherical graphitic particles can be controlled by varying the configuration of the supported catalyst within the reactor.

Spherical graphitic particles with a mean diameter of 0.5 µm and displaying high graphitization are typically produced in a configuration wherein the supported bimetallic catalyst is disposed on a substantially horizontal surface of the reactor and subjected to a transverse flow of light hydrocarbon at about 1 atm. On attaining a mean diameter of 0.5 µm, the graphitic particles detach themselves from the supported catalyst and no further growth of the graphitic particles is observed.

Spherical graphitic particles with a mean diameter of 4 µm and comprising a portion of amorphous carbon material are typically produced in a configuration wherein the supported bimetallic catalyst can be suspended in a bed of quartz wool disposed within an interior of the reactor and subjected to a longitudinal flow of light hydrocarbon at about 1 atm. On attaining a mean diameter of 0.5 µm, the graphitic particles appear to detach themselves from the supported catalyst but further growth is observed.

While not wanting to be bound by theory, the inventors opine that filaments of quartz wool in close proximity to the supported bimetallic catalyst retain "embryonic" (~0.5 µm) graphitic particles, and because of the close proximity of the retained particles to the supported catalyst, the particles continue to grow, albeit with a portion of amorphous carbon.

Figure 13:
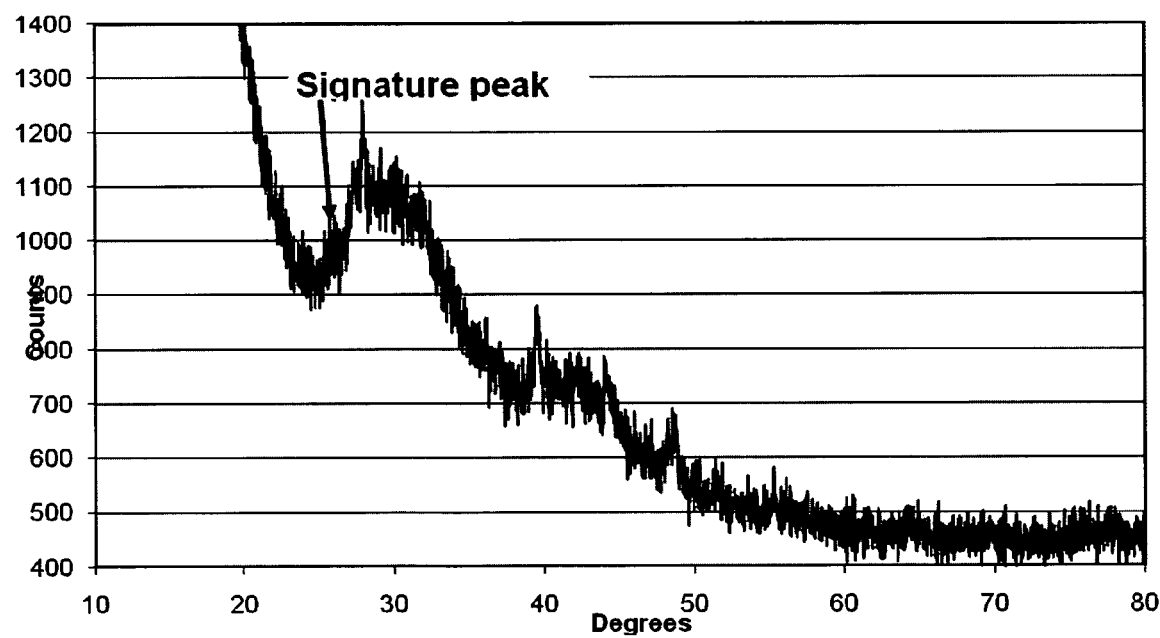
FIG. 13 shows the XRD signature of the 4 µm graphitized carbon particles.

Spherical graphitic particles with a mean diameter at the higher end of this range displayed a more diffuse XRD signature as shown in FIG. 13. The amorphous carbon material can be readily converted to high quality graphite by thermal treatment of the recovered spherical graphitic particles at temperatures beyond 2500° C.

As will be evident from the foregoing description, the process and apparatus of the present invention facilitates a reduction of greenhouse gas emissions in comparison with conventional technologies for generation of electricity from hydrocarbons.

A financial instrument tradable under a greenhouse gas Emissions Trading Scheme (ETS) may be created by exploitation of the apparatus 10 (FIG. 4) of the present invention or by employing the processes of the present invention. The instrument may be, for example, one of either a carbon credit, carbon offset or renewable energy certificate. Generally, such instruments are tradable on a market that is arranged to discourage greenhouse gas emission through a cap and trade approach, in which total emissions are 'capped', permits are allocated up to the cap, and trading is allowed to let the market find the cheapest way to meet any necessary emission reductions. The Kyoto Protocol and the European Union ETS are both based on this approach. One example of how credits may be generated by using the gas liquefaction plant follows. A person in an industrialised country wishes to get credits from a Clean Development Mechanism (CDM) project, under the European ETS. The person contributes to the establishment of an electricity generation plant comprising one or more apparatuses according to the present invention or an electricity generation plant employing the processes of the present invention. Credits (or Certified Emission Reduction Units where each unit is equivalent to the reduction of one metric tonne of $CO_2$ or its equivalent) may then be issued to the person. The number of CERs issued is based on the monitored difference between the baseline and the actual emissions. It is expected by the applicant that offsets or credits of a similar nature to CERs will be soon available to persons investing in low carbon emission energy generation in industrialised nations, and these could be similarly generated.

Examples

Materials and Methods

Preparation of a Loaded and Passive Catalyst

Mesh 316SS having an 0.16 mm Aperture and 0.1 mm wire diameter was cut into 20×40 mm sections and rolled width-wise. The mesh was then ultra-sonicated in ethanol for 15 min and then distilled water for 5 min.

Loading syrup was made up by dissolving 2.0563 g LaN3O9.6H2O, 0.0658 g Mg(NO3)2.6H2O, 1.1652 g Ni(NO3)2.6H2O, and 0.2926 g CoN2O6.6H2O into 50 ml of distilled water at 90 C and 60 rpm, and once dissolved, adding 25 g of citric acid. The solution was heated until it became syrup-like (~30 ml), and then poured into a large ceramic dish (30 ml) in which 8 meshes were placed. This was referred to as the 'loaded catalyst'.

In a smaller empty ceramic dish (20 ml), a further 8 meshes were placed, and this was referred to as the 'passive catalyst'.

Both ceramic dishes were placed on a stainless steel tray side by side and placed in the center of a calcination tube furnace (Modutemp vacuum horizontal tube furnace—50 mm diameter 1 m length). The furnace tube end that was closest to the small dish was left open and the other end was closed completely. The calcination furnace was heated to 900° C. at a steady rate over 1.5 hrs, then the temperature was maintained at 900° C. for 2 hrs, after which time it was allowed to cool to room temperature.

Cracking

A single catalyst was placed in a ¼" OD SS reactor tube and heated to 900° C. whilst under the flow of 20 sccm Nitrogen for 2 hrs. The temperature of the furnace was reduced to 800° C., and methane was passed into the reactor at 1.5 sccm.

Preparation of a Water Catalyst

Mesh 316SS having a 0.16 mm Aperture and 0.1 mm wire diameter was cut into 20×40 mm sections and rolled width-wise. The mesh was ultra-sonicated in ethanol for 15 min and then distilled water for 5 min. This was referred to as the 'water catalyst'. The washed meshes were then placed in a stainless steel tray (60 ml) which was filled with distilled water and placed in the centre of the calcination tube furnace (Modutemp vacuum horizontal tube furnace—50 mm diameter 1 m length). One end of the calcination furnace was opened and the other was closed. The calcination furnace was heated to 900° C. at a steady rate over 1.5 hrs, kept constant at 900° C. for 2 hrs, after which time is was allowed to cool to room temperature.

Cracking

A single catalyst was placed in a ¼" OD SS reactor tube and heated to 900° C. whilst under the flow of 20 sccm Nitrogen for 0.5 hrs. The temperature was maintained at 900° C. and methane was passed into the reactor at 1.5 sccm.

Analysis of Catalyst Performance

Figure 14:
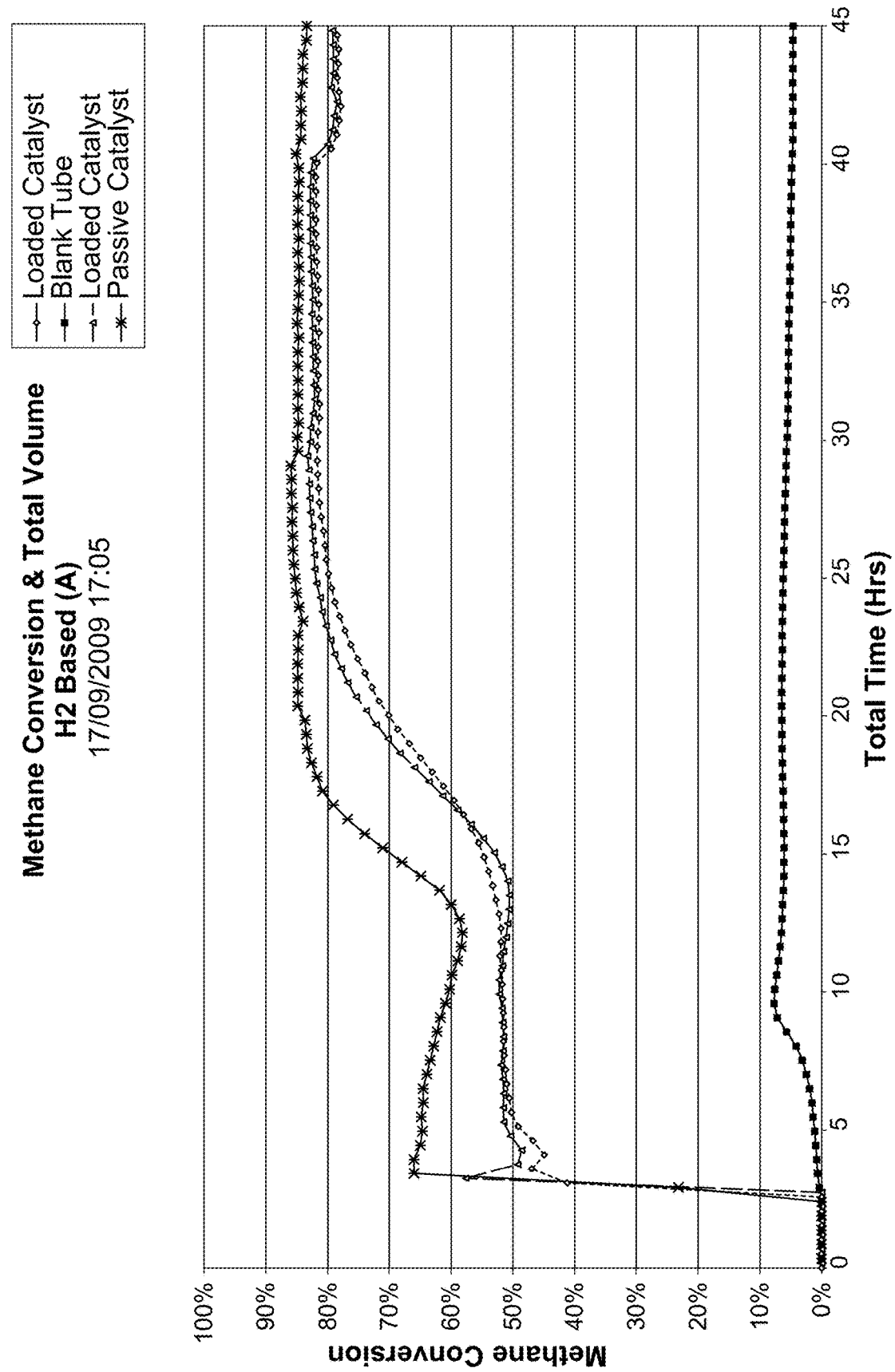
FIG. 14 shows the methane conversion and total volume of a loaded and passive catalyst of the example.
Figure 15:
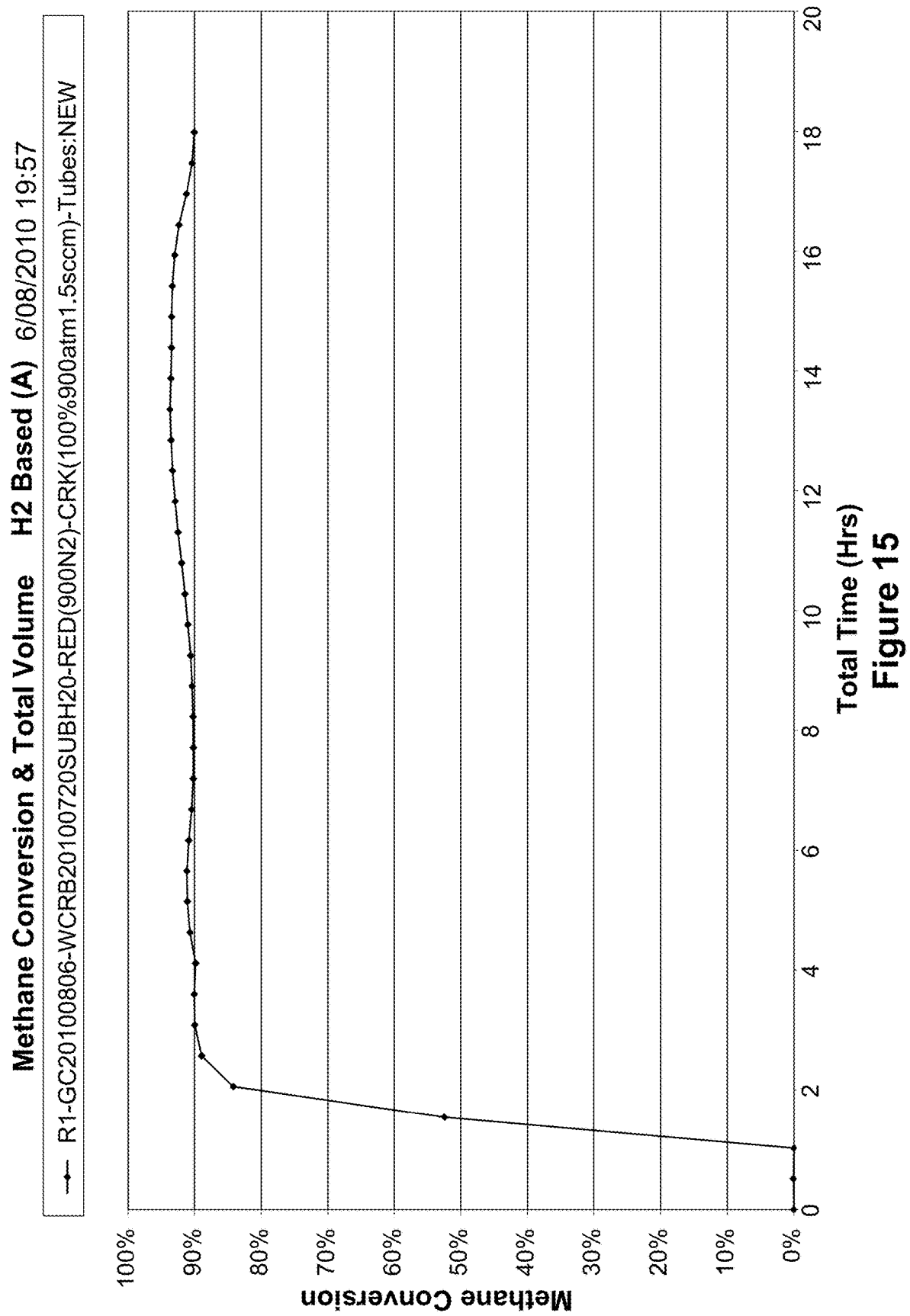
FIG. 15 shows the methane conversion and total volume of a water catalyst of the example.

The conversion efficiency of the loaded and passive catalysts were monitored over time and compared (FIGS. 14 and 15).

Figure 16:
FIG. 16 shows an SEM image of the water submerged mesh of the water catalyst of the example.
Figure 17:
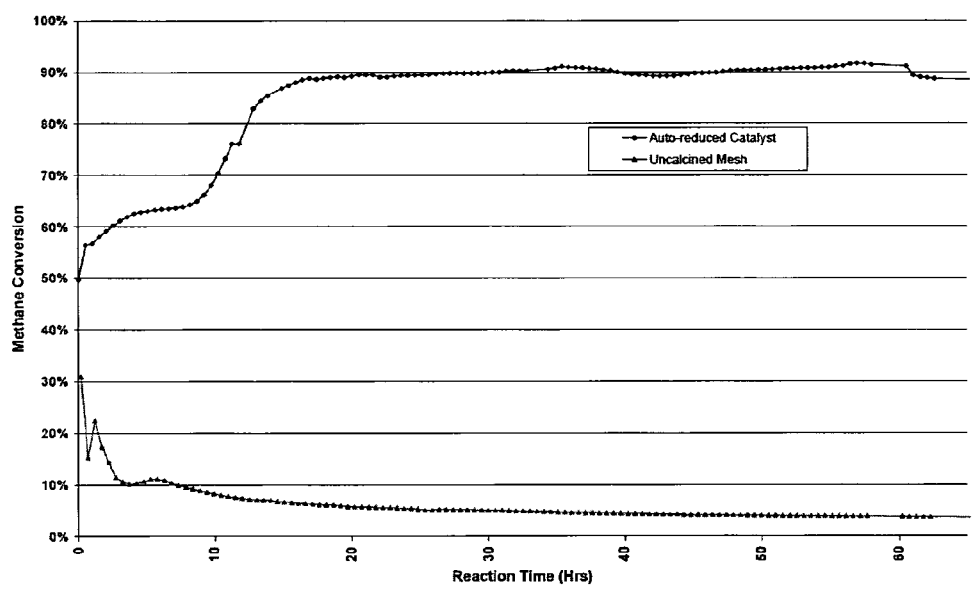
FIG. 17 shows a graph of the conversion efficiency of the water catalyst of the example over time.

The water submerged mesh of the water catalyst was analysed by Scanning Electron Microscopy (SEM) (FIG. 16) and the conversion efficiency of the water catalyst was monitored over time and compared to that of uncalcined mesh (FIG. 17).

Figure 18:
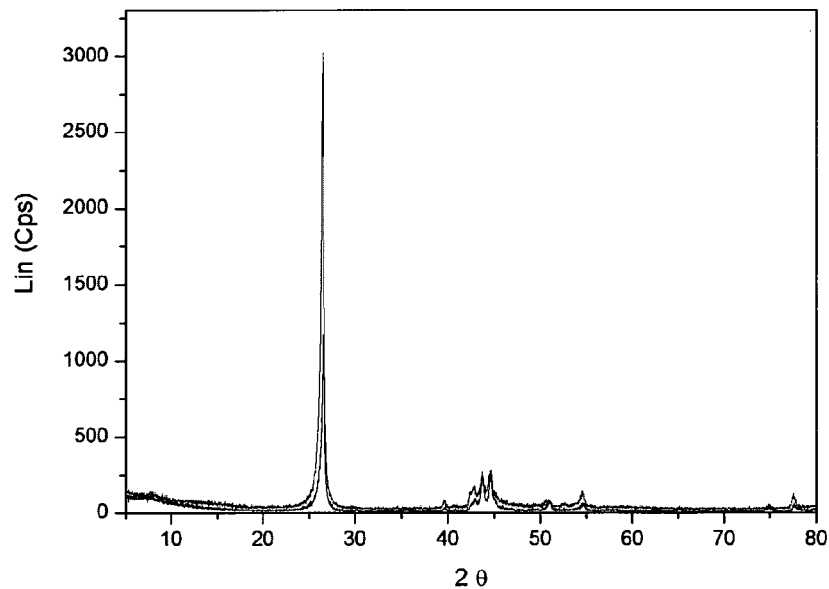
FIG. 18 shows the XRD signature of the cracked carbon.
Figure 19:
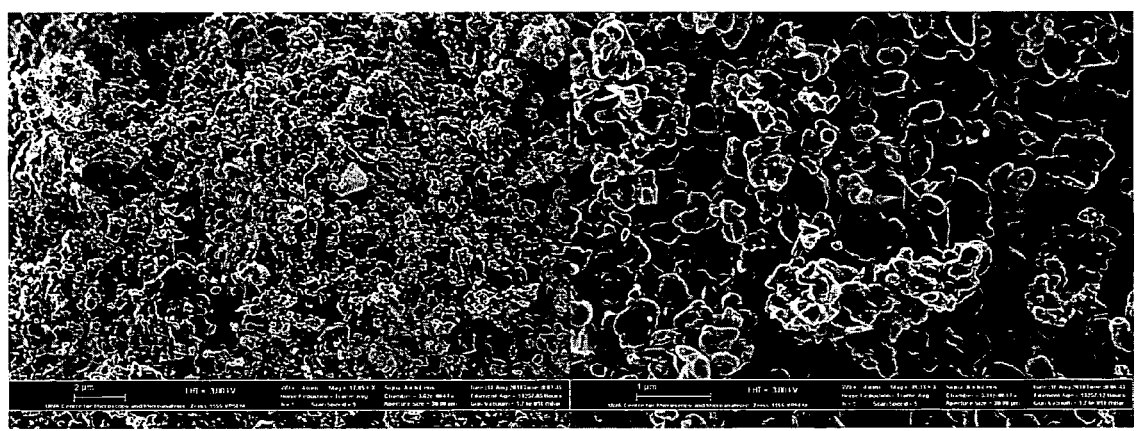
FIGS. 19 a and b shows SEM images of the harvested carbon.
Figure 20:
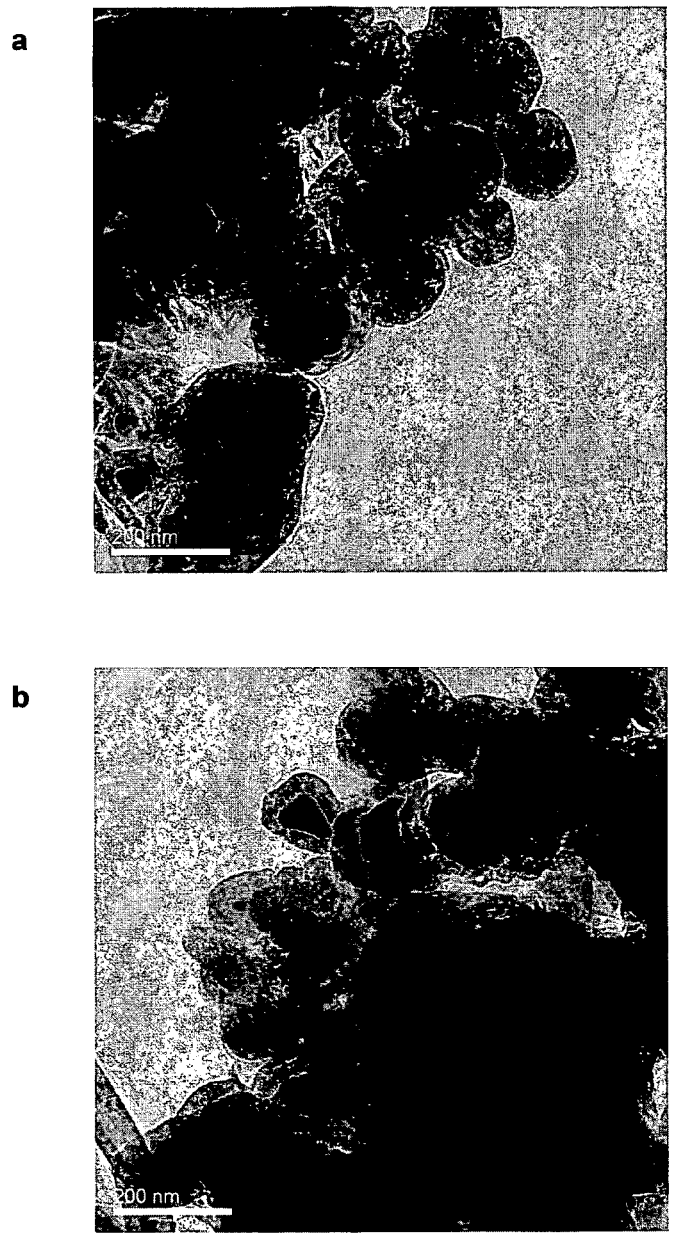
FIGS. 20 a and b shows TEM images of the harvested carbon.

Once cracked carbon was obtained, its X-ray diffraction (XRD) signature was determined according to routine procedures in the art (FIG. 18), and the harvested carbon visualized using SEM (FIGS. 19a and b) and Transmission Electron Microscopy (TEM) (FIGS. 20 a and b).

The claims defining the invention are as follows:

1. A process for producing hydrogen from a hydrocarbon gas comprising contacting, at a temperature in the range from 500° C. to 1200° C., the hydrocarbon gas with a catalyst to catalytically convert the hydrocarbon gas to hydrogen and solid carbon; wherein the catalyst comprises a calcined Fe-containing catalyst; and wherein the solid carbon is generated in the catalytic conversion as spherical graphitic particles.

2. The process according to claim 1, wherein the hydrocarbon gas is contacted with the calcined Fe-containing catalyst at a temperature in a temperature range of from 650° C. to 1100° C.

3. The process according to claim 1, wherein the hydrocarbon gas is contacted with the calcined Fe-containing catalyst at a temperature in a temperature range of from 800° C. to 1100° C.

4. The process according to claim 1, wherein the hydrocarbon gas is contacted with the calcined Fe-containing catalyst at a pressure range of from 1.75 bar to 10 bar.

5. The process according to claim 1, wherein the Fe-containing catalyst is selected from the group comprising stainless steel, carbon steel, rare earth doped stainless steel, low carbon stainless steel, and iron-containing metal alloys.

6. The process according to claim 1, wherein the Fe-containing catalyst is an Fe-containing metal alloy with a catalytic activator.

7. The process according to claim 6, wherein the catalytic activator is selected from a group consisting of nickel, molybdenum, ruthenium, tantalum, lanthanide metals, and titanium.

8. The process according to claim 1, wherein prior to contacting the hydrocarbon gas with the Fe-containing catalyst, said catalyst is calcined at a temperature greater than 700° C. for a period of from about one to two hours.

9. The process according to claim 8, wherein after calcining, the calcined Fe-containing catalyst is reduced at elevated temperatures.

10. The process according to claim 9, wherein the calcined Fe-containing catalyst is reduced in the presence of a reducing agent.

11. The process according to claim 9, wherein the calcined Fe-containing catalyst undergoes reduction with methane contained in the hydrocarbon gas concurrently with the catalytic conversion of hydrocarbon gas into hydrogen and solid carbon.

12. The process according to claim 1, wherein the hydrocarbon gas is one or more chemical compounds that contain only carbon and hydrogen, having a carbon number of 6 or less.

13. The process according to claim 1, wherein the hydrocarbon gas is methane.

14. The process according to claim 1, wherein the mean diameter of the spherical graphitic particles is 0.4-4 µm.

15. The process according to claim 1, comprising the further step of thermally treating the recovered spherical graphitic particles and converting any ambient amorphous carbon material to graphite.

16. The process according to claim 10, wherein the reducing agent is hydrogen.

17. A process for generating electricity from light hydrocarbons, the process comprising the steps of:
contacting, at a temperature in the range from 500° C. to 1200° C., a hydrocarbon gas with a catalyst to catalytically convert the hydrocarbon gas to hydrogen and solid carbon, wherein the solid carbon is generated in the catalytic conversion as spherical graphitic particles;
(ii) separating and recovering the hydrogen generated in step (i);
(iii) using a first portion of recovered hydrogen in a fuel cell to generate electricity; and
(iv) combusting a second portion of recovered hydrogen to generate elevated temperature in step (i);

wherein, the catalyst comprises a calcined Fe-containing catalyst.

18. The process according to claim 17, further comprising the step of:
(v) providing hydrogen feedstock for ammonia synthesis.

19. An apparatus for generating electricity from light hydrocarbons, the apparatus comprising:
(i) a catalytic reactor comprising a catalyst, wherein the catalytic reactor is configured to receive a hydrocarbon gas and contact said gas with said catalyst at a temperature in the range from 500° C. to 1200° C., to catalytically convert the hydrocarbon gas to hydrogen and solid carbon, wherein the solid carbon is generated in the catalytic conversion as spherical graphitic particles;
(ii) a separator to separate and recover hydrogen generated in the catalytic reactor; and
(iii) a fuel cell configured to receive and use a first portion of recovered hydrogen to generate electricity;
wherein, the catalyst comprises: a calcined Fe-containing catalyst; and
the catalytic reactor is adapted to receive and combust a second portion of recovered hydrogen to elevate temperatures therein.

* * * * *